US008441947B2

(12) United States Patent
Pratt, Jr. et al.

(10) Patent No.: US 8,441,947 B2
(45) Date of Patent: May 14, 2013

(54) SIMULTANEOUS DATA PACKET PROCESSING

(75) Inventors: Wallace A. Pratt, Jr., Pflugerville, TX (US); Chuck Middleton, Lago Vista, TX (US); Mark M. Okamura, Austin, TX (US); Daraius Hathiram, Austin, TX (US); Ronald E. Ham, Austin, TX (US)

(73) Assignee: Hart Communication Foundation, Austin, TX (US)

( * ) Notice: Subject to any disclaimer, the term of this patent is extended or adjusted under 35 U.S.C. 154(b) by 909 days.

(21) Appl. No.: 12/490,205

(22) Filed: Jun. 23, 2009

(65) Prior Publication Data

US 2010/0110916 A1 May 6, 2010

Related U.S. Application Data

(60) Provisional application No. 61/074,954, filed on Jun. 23, 2008.

(51) Int. Cl.
*G01R 31/08* (2006.01)
(52) U.S. Cl.
USPC .......................................... 370/252; 370/419
(58) Field of Classification Search .................. 370/241, 370/241.1, 242, 243, 244, 245, 246, 247, 370/248, 249, 250, 251, 252, 253, 419, 420, 370/421
See application file for complete search history.

(56) References Cited

U.S. PATENT DOCUMENTS

| 4,792,944 | A | | 12/1988 | Takahashi et al. | |
|---|---|---|---|---|---|
| 5,159,592 | A | | 10/1992 | Perkins | |
| 5,459,855 | A | * | 10/1995 | Lelm | 713/400 |
| 5,535,193 | A | * | 7/1996 | Zhang et al. | 370/253 |

(Continued)

FOREIGN PATENT DOCUMENTS

| CA | 2324563 A1 | 9/1999 |
|---|---|---|
| CN | 1170464 A | 1/1998 |

(Continued)

OTHER PUBLICATIONS

International Search Report and Written Opinion for corresponding International Application No. PCT/US2009/048342, mailing date Feb. 24, 2010.

(Continued)

*Primary Examiner* — Ayaz Sheikh
*Assistant Examiner* — Mounir Moutaouakil
(74) *Attorney, Agent, or Firm* — Marshall, Gerstein & Borun LLP

(57) ABSTRACT

A packet controller for simultaneous processing of data packets transmitted via a plurality of communication channels includes a plurality of inputs to receive a respective plurality of signals, such that each of the plurality of signals is indicative of a presence of a data packet on a respective one of the plurality of communication channels, a clock source to supply a periodic clock signal, a plurality of independent processing modules coupled to the respective plurality of inputs to simultaneously process the plurality of signals, such that each of the plurality of independent processing modules implements a respective state machine driven by the periodic clock signal to process the respective signal independently of every other one of the plurality of processing modules, and an output to transmit an output signal indicative of a presence of at least one data packet on one or more of the plurality of communication channels.

17 Claims, 15 Drawing Sheets

U.S. PATENT DOCUMENTS

| | | | |
|---|---|---|---|
| 5,719,859 | A | 2/1998 | Kobayashi et al. |
| 5,781,549 | A * | 7/1998 | Dai .............................. 370/398 |
| 5,926,531 | A | 7/1999 | Petite |
| 6,028,522 | A | 2/2000 | Petite |
| 6,198,751 | B1 | 3/2001 | Dorsey et al. |
| 6,218,953 | B1 | 4/2001 | Petite |
| 6,233,327 | B1 | 5/2001 | Petite |
| 6,236,334 | B1 | 5/2001 | Tapperson et al. |
| 6,298,377 | B1 | 10/2001 | Hartikainen et al. |
| 6,430,268 | B1 | 8/2002 | Petite |
| 6,437,692 | B1 | 8/2002 | Petite et al. |
| 6,522,974 | B2 | 2/2003 | Sitton |
| 6,532,507 | B1 * | 3/2003 | Falik et al. .................... 710/107 |
| 6,556,335 | B2 * | 4/2003 | Lee et al. ...................... 359/238 |
| 6,578,047 | B1 | 6/2003 | Deguchi |
| 6,594,530 | B1 | 7/2003 | Glanzer et al. |
| 6,618,578 | B1 | 9/2003 | Petite |
| 6,628,764 | B1 | 9/2003 | Petite |
| 6,747,557 | B1 | 6/2004 | Petite et al. |
| 6,801,777 | B2 | 10/2004 | Rusch |
| 6,836,737 | B2 | 12/2004 | Petite et al. |
| 6,891,838 | B1 | 5/2005 | Petite et al. |
| 6,914,533 | B2 | 7/2005 | Petite |
| 6,914,893 | B2 | 7/2005 | Petite |
| 6,920,171 | B2 | 7/2005 | Souissi et al. |
| 6,959,356 | B2 | 10/2005 | Packwood et al. |
| 6,970,909 | B2 | 11/2005 | Schulzrinne |
| 6,996,100 | B1 | 2/2006 | Haartsen |
| 7,002,958 | B1 | 2/2006 | Basturk et al. |
| 7,053,767 | B2 | 5/2006 | Petite et al. |
| 7,079,810 | B2 | 7/2006 | Petite et al. |
| 7,103,511 | B2 | 9/2006 | Petite |
| 7,110,380 | B2 | 9/2006 | Shvodian |
| 7,137,550 | B1 | 11/2006 | Petite |
| 7,209,840 | B2 | 4/2007 | Petite et al. |
| 7,292,246 | B2 | 11/2007 | Goldschmidt |
| 7,295,128 | B2 | 11/2007 | Petite |
| 7,346,463 | B2 | 3/2008 | Petite et al. |
| 7,375,594 | B1 | 5/2008 | Lemkin et al. |
| 7,397,907 | B2 | 7/2008 | Petite |
| 7,420,980 | B1 | 9/2008 | Pister et al. |
| 7,468,661 | B2 | 12/2008 | Petite et al. |
| 7,529,217 | B2 | 5/2009 | Pister et al. |
| 7,602,741 | B2 | 10/2009 | Tapperson et al. |
| 7,650,425 | B2 | 1/2010 | Davis et al. |
| 7,675,935 | B2 | 3/2010 | Samudrala et al. |
| 7,680,033 | B1 | 3/2010 | Khan et al. |
| 7,697,492 | B2 | 4/2010 | Petite |
| 7,848,827 | B2 | 12/2010 | Chen |
| 7,853,221 | B2 | 12/2010 | Rodriguez et al. |
| 7,978,059 | B2 | 7/2011 | Petite et al. |
| 8,013,732 | B2 | 9/2011 | Petite et al. |
| 8,064,412 | B2 | 11/2011 | Petite |
| 8,098,676 | B2 * | 1/2012 | Connor ........................ 370/419 |
| 2001/0030957 | A1 | 10/2001 | McCann et al. |
| 2001/0041591 | A1 | 11/2001 | Carroll |
| 2002/0007414 | A1 | 1/2002 | Inoue et al. |
| 2002/0013679 | A1 | 1/2002 | Petite |
| 2002/0031101 | A1 | 3/2002 | Petite et al. |
| 2002/0067693 | A1 | 6/2002 | Kodialam et al. |
| 2002/0111169 | A1 | 8/2002 | Vanghi |
| 2002/0120671 | A1 | 8/2002 | Daffner et al. |
| 2003/0014535 | A1 | 1/2003 | Mora |
| 2003/0026268 | A1 | 2/2003 | Navas |
| 2003/0040897 | A1 | 2/2003 | Murphy et al. |
| 2003/0074489 | A1 | 4/2003 | Steger et al. |
| 2003/0169722 | A1 | 9/2003 | Petrus et al. |
| 2003/0198220 | A1 | 10/2003 | Gross et al. |
| 2003/0236579 | A1 | 12/2003 | Hauhia et al. |
| 2004/0011716 | A1 | 1/2004 | Sandt et al. |
| 2004/0028023 | A1 | 2/2004 | Mandhyan et al. |
| 2004/0053600 | A1 | 3/2004 | Chow et al. |
| 2004/0095951 | A1 | 5/2004 | Park |
| 2004/0117497 | A1 | 6/2004 | Park |
| 2004/0148135 | A1 | 7/2004 | Balakrishnan et al. |
| 2004/0174904 | A1 | 9/2004 | Kim et al. |
| 2004/0183687 | A1 | 9/2004 | Petite et al. |
| 2004/0203973 | A1 | 10/2004 | Khan |
| 2004/0257995 | A1 | 12/2004 | Sandy et al. |
| 2004/0259533 | A1 | 12/2004 | Nixon et al. |
| 2005/0013253 | A1 | 1/2005 | Lindskog et al. |
| 2005/0018643 | A1 | 1/2005 | Neilson et al. |
| 2005/0025129 | A1 | 2/2005 | Meier |
| 2005/0030968 | A1 | 2/2005 | Rich et al. |
| 2005/0049727 | A1 | 3/2005 | Tapperson et al. |
| 2005/0078672 | A1 | 4/2005 | Caliskan et al. |
| 2005/0085928 | A1 | 4/2005 | Shani |
| 2005/0114517 | A1 | 5/2005 | Maffeis |
| 2005/0125085 | A1 | 6/2005 | Prasad et al. |
| 2005/0160138 | A1 | 7/2005 | Ishidoshiro |
| 2005/0164684 | A1 | 7/2005 | Chen et al. |
| 2005/0190712 | A1 | 9/2005 | Lee et al. |
| 2005/0192037 | A1 | 9/2005 | Nanda et al. |
| 2005/0213612 | A1 | 9/2005 | Pister et al. |
| 2005/0228509 | A1 | 10/2005 | James |
| 2005/0239413 | A1 | 10/2005 | Wiberg et al. |
| 2005/0249137 | A1 | 11/2005 | Todd et al. |
| 2005/0276233 | A1 | 12/2005 | Shepard et al. |
| 2005/0282494 | A1 | 12/2005 | Kossi et al. |
| 2006/0007927 | A1 | 1/2006 | Lee et al. |
| 2006/0029060 | A1 | 2/2006 | Pister |
| 2006/0029061 | A1 | 2/2006 | Pister et al. |
| 2006/0045016 | A1 | 3/2006 | Dawdy et al. |
| 2006/0062192 | A1 | 3/2006 | Payne |
| 2006/0067280 | A1 | 3/2006 | Howard et al. |
| 2006/0077917 | A1 | 4/2006 | Brahmajosyula et al. |
| 2006/0120384 | A1 | 6/2006 | Boutboul et al. |
| 2006/0174017 | A1 | 8/2006 | Robertson |
| 2006/0182076 | A1 | 8/2006 | Wang |
| 2006/0192671 | A1 | 8/2006 | Isenmann et al. |
| 2006/0213612 | A1 | 9/2006 | Perron et al. |
| 2006/0215582 | A1 | 9/2006 | Castagnoli et al. |
| 2006/0245440 | A1 | 11/2006 | Mizukoshi |
| 2006/0253584 | A1 | 11/2006 | Dixon et al. |
| 2007/0016724 | A1 | 1/2007 | Gaither et al. |
| 2007/0070943 | A1 | 3/2007 | Livet et al. |
| 2007/0074489 | A1 | 4/2007 | Erhardt et al. |
| 2007/0076600 | A1 | 4/2007 | Ekl et al. |
| 2007/0078995 | A1 | 4/2007 | Benard et al. |
| 2007/0109592 | A1 | 5/2007 | Parvathaneni et al. |
| 2007/0118604 | A1 | 5/2007 | Costa Requena |
| 2007/0121531 | A1 | 5/2007 | Lee et al. |
| 2007/0121615 | A1 * | 5/2007 | Weill et al. .................... 370/389 |
| 2007/0124654 | A1 * | 5/2007 | Smolinske et al. ........... 714/786 |
| 2007/0140245 | A1 | 6/2007 | Anjum et al. |
| 2007/0143392 | A1 | 6/2007 | Choe et al. |
| 2007/0153010 | A1 * | 7/2007 | Uhlik ............................ 345/501 |
| 2007/0161371 | A1 | 7/2007 | Dobrowski et al. |
| 2007/0237094 | A1 | 10/2007 | Bi et al. |
| 2007/0243879 | A1 | 10/2007 | Park et al. |
| 2007/0280144 | A1 | 12/2007 | Hodson et al. |
| 2007/0280286 | A1 | 12/2007 | Hodson et al. |
| 2007/0282463 | A1 | 12/2007 | Hodson et al. |
| 2007/0283030 | A1 | 12/2007 | Deininger et al. |
| 2008/0075007 | A1 | 3/2008 | Mehta et al. |
| 2008/0082636 | A1 | 4/2008 | Hofmann et al. |
| 2008/0084852 | A1 | 4/2008 | Karschnia |
| 2008/0098226 | A1 | 4/2008 | Zokumasui |
| 2008/0117836 | A1 | 5/2008 | Savoor et al. |
| 2008/0120676 | A1 | 5/2008 | Morad et al. |
| 2008/0148296 | A1 | 6/2008 | Chen et al. |
| 2008/0192812 | A1 | 8/2008 | Naeve et al. |
| 2008/0198860 | A1 | 8/2008 | Jain et al. |
| 2008/0215773 | A1 | 9/2008 | Christison et al. |
| 2008/0285582 | A1 | 11/2008 | Pister et al. |
| 2009/0059855 | A1 | 3/2009 | Nanda et al. |
| 2009/0068947 | A1 | 3/2009 | Petite |
| 2009/0097502 | A1 | 4/2009 | Yamamoto |
| 2009/0154481 | A1 | 6/2009 | Han et al. |
| 2009/0323594 | A1 * | 12/2009 | Mishra et al. ................. 370/328 |
| 2010/0194582 | A1 | 8/2010 | Petite |
| 2010/0312881 | A1 | 12/2010 | Davis et al. |
| 2011/0264324 | A1 | 10/2011 | Petite et al. |
| 2011/0309953 | A1 | 12/2011 | Petite et al. |
| 2011/0320050 | A1 | 12/2011 | Petite et al. |

FOREIGN PATENT DOCUMENTS

| | | |
|---|---|---|
| CN | 1804744 A | 7/2006 |
| EP | 1169690 A2 | 1/2002 |
| EP | 1236075 A2 | 9/2002 |
| EP | 1293853 A1 | 3/2003 |
| EP | 1370958 A1 | 12/2003 |
| EP | 1376939 A2 | 1/2004 |
| EP | 2388708 A1 | 11/2011 |
| GB | 2 403 043 A | 12/2004 |
| JP | 2005143001 | 6/2005 |
| KR | 1020010076781 | 8/2001 |
| KR | 1020040048245 | 6/2004 |
| KR | 1020050028737 | 3/2005 |
| KR | 1020060066580 | 6/2006 |
| KR | 1020050016891 | 9/2006 |
| KR | 1020060111318 | 10/2006 |
| KR | 1020070026600 | 3/2007 |
| WO | WO-00/55825 A1 | 9/2000 |
| WO | WO-01/35190 A2 | 5/2001 |
| WO | WO-02/05199 A1 | 1/2002 |
| WO | WO-02/13036 A1 | 2/2002 |
| WO | WO-02/13412 A1 | 2/2002 |
| WO | WO-02/13413 A1 | 2/2002 |
| WO | WO-02/13414 A1 | 2/2002 |
| WO | WO-02/075565 A1 | 9/2002 |
| WO | WO-2005079026 A1 | 8/2005 |
| WO | WO-2005/096722 A2 | 10/2005 |
| WO | WO-2006121114 A1 | 11/2006 |

OTHER PUBLICATIONS

Deering et al., "Internet Protocol, Version 6 (IPv6) Specification; rfc1883.txt", IETF Standard, Internet Engineering Task Force, IETF, CH, Dec. 1, 1995, XP015007667.

Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.

Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.

Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.

Kastner et al., "Communication Systems for Building Automation and Control," Proceedings of the IEEE, vol. 93, No. 6, Jun. 1, 2005, pp. 1178-1203.

Thomesse, J., "Fieldbus Technology in Industrial Automation," Proceedings of the IEEE, vol. 93, No. 6, Jun. 1, 2005, pp. 1073-1101.

Cleveland, F., "IEC TC57 Security Standards for the Power System's Information Infrastructure—Beyond Simple Encryption," May 21, 2006, pp. 1079-1087.

Matkurbanov et al., "A Survey and Analysis of Wireless Fieldbus for Industrial Environments," SICE-ICCAS 2006 International Joint Conference, 5555-5561 (2006).

Lopez et al., "Wireless communications deployment in industry: a review of issues, options and technologies," Computers in Industry, Elsevier Science, 56:29-53 (2005).

Shen et al., "Wireless Sensor Networks for Industrial Applications," WCICA, 15-19 (2004).

"A Survey and Analysis of Wireless Field bus for Industrial Environments", Pulat Matkurbanov, SeungKi Lee, Dong-Sung Kim; Dept. of Electron. Eng., Kumoh Nat. Inst. of Technol., Gumi. This paper appears in: SICE-ICASE, 2006. International Joint Conference: Issue Date: Oct. 18-21, 2006, on pp. 55555-55561; Print ISBN: 89-950038-4-7.

"D1100 SmartMesh Network Release 1.0 Engineering Software Specifications," Dust Networks, Dec. 17, 2011, 36 pages.

"D1100 SmartMesh Network Release 1.0 Engineering Software Specifications," Dust Networks, 36 pages.

"Multiple Interpenetrating MultiDiGraphs," Dust Incorporated, 12 pages. (Powerpoint).

"SmartMesh-XT CLI Commands Guide," Dust Networks, Inc., Jun. 27, 2007, 36 pages.

SmartMesh-XT KT1030/KT2135/KT2030 Evaluation Kit Guide, Dust Networks, Inc., Nov. 2, 2007, 58 pages.

"SmartMesh-XT M2135-2, M2030-2 2.4 GHz Wireless Analog/Digital/Serial Motes," Dust Networks, Inc., Mar. 28, 2007, 33 pages.

SmartMesh-XT Manager XML API Guide, Dust Networks, Inc., Apr. 4, 2007, 148 pages.

"System Description for Security Review SmartMesh Alba," Dust Networks, 32 pages.

Berlemann, Software Defined Protocols Based on Generic Protocol Functions for Wired and Wireless Networks, Nov, 2033, RWTH Aachen University.

Qu et al., "A web-enabled distributed control application platform for industrial automation", Emerging Technologies and Factory Automation, Proceedings, 2:129-32 (Sep. 16, 2003).

Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).

Zheng, "ZigBee wireless sensor network in industrial applications", SICE-ICCAS 2006 International Joint Conference, IEEE, New Jersey, pp. 1067-1070 (Oct. 1, 2006).

* cited by examiner

SIMULTANEOUS DATA PACKET PROCESSING

CROSS-REFERENCE TO RELATED APPLICATIONS

This application is based on and claims the benefit of priority to U.S. Provisional Application No. 61/074,954, entitled "Wireless Communication Network Analyzer" filed Jun. 23, 2008, the entire disclosure of which is hereby expressly incorporated herein by reference.

FIELD OF TECHNOLOGY

The present patent relates generally to wireless communications and, more particularly, to a device for capturing and analyzing data transmitted via multiple wireless communication channels.

BACKGROUND

The WirelessHART communication protocol establishes a wireless communication standard for process applications. More particularly, WirelessHART is a secure, wireless mesh networking communication technology operating in the 2.4 GHz ISM radio band. WirelessHART utilizes IEEE STD 802.15.4-2006 2.4 GHz DSSS transceivers with channel hopping on a transaction by transaction basis. WirelessHART communication is arbitrated using time division multiple access (TDMA) to schedule link activity. All communications are performed within a designated slot and one or more sources and one or more destination devices may be scheduled to communicate in a given slot. Thus, a slot may be dedicated to communication from a single source device or a slot may support shared communication access between multiple devices. The message being propagated by the source device on a slot may be addressed to a specific device or may be broadcast to each of the destination devices assigned to the slot.

To be successful, WirelessHART must support interoperability and allow compliant devices from different manufactures to be mixed in the same network to create an integrated system. The HART Communication Foundation (HCF) has always had a strict definition of interoperability. In particular, HCF defines "interoperability" as the ability for like devices from different manufacturers to work together in a system and be substituted one for another without loss of functionality at the host system level.

To attain compliance, the HCF has developed a quality assurance program to ensure the compliance of WirelessHART products. The objective of the WirelessHART quality assurance program is to ensure product adherence to the high standards of interoperability and compatibility defined by the HCF.

Using the network analyzer or radio capture tools available today, an operator may monitor an individual communication channel by tuning a network analyzer to the radio frequency associated with the channel and attempting to capture data packets transmitted via this communication channel. To monitor another communication channel, the operator needs to either adjust the frequency setting of the network analyzer being used, or use another network analyzer. Thus, to monitor multiple channels at the same time, the operator needs to set up and operate several network analyzers. In addition to the inconvenience, high cost, and stringent calibration requirements associated with using multiple network analyzers at the same time, the operator may also generate undesirable interference in the respective antennas of the network analyzers when placing these devices close to each other.

SUMMARY

A wireless communication network analyzer for use in, for example, an IEEE 802.11 or 802.15-compliant communication network, includes an acquisition engine to capture and process data packets or other data units transmitted on multiple wireless communication channels, and a user interface to display information related to the data packets and to support channel configuration and selection commands. In some embodiments, the wireless communication network is a WirelessHART network that operates in a process control environment and communicates on IEEE STD 802.15.4-2006 2.4 GHz channels. The acquisition engine includes a radio frequency (RF) interface that can capture communications on multiple radio channels simultaneously and a packet server to receive data packets and related statistics (e.g., Received Signal Level ($RSL_-$, Link Quality Indicator (LQI), Cyclic Redundancy Check (CRC) status) from the RF interface, provide the data packets and the statistics to the local user interface and/or one or more client applications, and control data capture at the RF interface.

The packet server and the user interface may run on a computer host that supports a standard operating system such as, for example, Linux, QNX, or Microsoft® Windows 2000, XP, or Vista. The RF interface may be implemented as a hardware component powered by the computer host via a USB connection interface such as USB 2.0. The same USB connection interface may also support communications between the packet server and the RF interface. In this manner, the acquisition engine may be manufactured using commercial, off-the-shelf hardware.

In some embodiments, the communication network in which the network analyzer operates is compliant with the 2.4 GHz IEEE Standard 802.15.4-2006 ("the Standard"), and the acquisition engine can capture communications on all 16 channels specified by the Standard. The acquisition engine may capture information related to all layers of the protocol stack, i.e., from the preamble and header associated with the lowest physical ("PHY") layer up to the complete payload of the application layer. In an embodiment, the communication network is a secure mesh WirelessHART network operating in a process control environment. In this embodiment, the network analyzer may perform conformance testing of WirelessHART products in addition to sniffing data packets for the purposes of supervising communications between devices.

In some embodiments, the RF interface includes a single antenna receives a wireless signal that includes all communication channels on which the network analyzer operates, at least one splitter to generate multiple copies of the received signal, and several radio transceivers to process communications on the respective communication channels using the copies of the received signal. Thus, in one operational mode, each radio transceiver is tuned to the frequency of the corresponding communication channel. In another operational mode, all radio transceivers of the RF interface are tuned to the same communication channel to perform reliable diagnostics of communications on the communication channel. In these embodiments, the radio transceivers are tunable. In an embodiment, a user can tune the radio transceivers by entering appropriate commands via the user interface of the network analyzer.

To allow the use of a single antenna with a relative large number of radio transceivers, the RF interface may also include a low noise amplifier (LNA) disposed upstream of the splitter to compensate for the loss of power that occurs when the splitter slits the received signal. In some embodiments, the LNA provides sufficient power compensation to enable first-stage splitting using a first-stage splitter, and second-stage splitting using several second-stage splitters, each coupled to a respective output of the first-stage splitter.

In another embodiment, the RF interface includes a bandpass filter that receives a signal from a single antenna, a first-stage amplifier coupled to the output of the bandpass filter, a first-stage splitter coupled to the output of the first-stage amplifier, several second-stage amplifier coupled to the respective outputs of the first-stage splitter, and several second-stage splitters each coupled to the respective second-stage amplifier. In one such embodiment, the first-stage splitter and each of the second-stage splitter is a four-way splitter to accordingly provide a 16-way split of the received radio signal for use by 16 radio transceivers.

In some embodiments, the RF interface further includes a central processing unit (CPU) such as a microcontroller, and a packet controller with at least a transceiver interface, a CPU interface, and a packet processing module. The CPU provides data packets captured by the radio transceivers to the packet server, receives configuration commands from user interface to be forwarded to the appropriate radio transceiver, etc. The CPU may receive configuration or control data, and transmit data packets and related statistics, via the USB interface connecting the RF interface to the computer host. In some embodiments, the CPU also provides a clock signal for use by other components of the RF interface, including the packet controller. Accordingly, the CPU interface of the packet controller may include a set of pins to transmit packets from the output queue of the packet controller, a pin to output a signal indicative of a presence of one or more data packets in the output queue of the packet controller, and a set of pins to receive a selection of a radio transceiver for control or configuration. In at least some of the embodiments, the CPU interface of the packet controller also includes a pin to receive a clock signal, a set of pins defining the known serial parallel interface.

The transceiver interface of the packet controller to the radio transceivers provides a separate connection to each transceiver. In some embodiments, the transceiver interface includes a group of sets of pins, each set in the group defining the SPI interface to the respective transceiver. For each transceiver, the transceiver interface may also include a pin to receive a signal indicative of the beginning of reception of a data packet at the transceiver, a pin to receive a signal indicative of the end of reception of a data packet at the transceiver, and a pin to receive a signal indicative of the end of transfer of data packets from the transceiver to the packet controller. In those embodiments where the packet controller has a SPI interface with the CPU and with each transceiver, the packet controller may be considered a serial packet controller (SPC) that operates as a slave device relative to the CPU and as a master device relative to each transceiver.

The packet controller may further provide independent first-in-first-out (FIFO) buffering for each communication channel, i.e., for data packets received from a particular transceiver. In some embodiments, the packet controller implements a separate state machine for each communication channel, and drives each state machine in parallel using a common clock signal. The clock signal may also drive a counter which the packet controller may use for time stamping data packets. In this manner, the packet controller can generate a highly accurate time stamp for each packet, so that two packets, A and B, detected simultaneously (i.e., within the same clock cycle) by two transceivers on the respective communication channels, acquire an identical time stamp. Thus, when the packet controller forwards the packets A and B to the CPU and, ultimately, to the packet server, the packet A may be forwarded prior to the packet B or, conversely, the packet B may be forwarded prior to the packet A. In either case, the packets A and B can be properly processed because the packet controller always generates a time stamp that reflects the time the data packet was received at the respective transceiver.

In an embodiment, the packet controller may be implemented as a field-programmable field array (FPGA). The FPGA may be commercially available off-the-shelf hardware, and the packet controller may be implemented as firmware. In other embodiments, the packet controller may be implemented using standard components such as AND and OR gates, for example, or another type of an application-specific integrated circuit (ASIC). The clock may be a low-drift crystal clock with a resolution and accuracy selected in view of the duration of a transmission period in the communication network in which the network analyzer operates. When the communication network is a WirelessHART network, the resolution and accuracy of the clock is preferably one microsecond to provide reliable analysis of communications within TDMA timeslots used by WirelessHART networks.

The packet server of the network analyzer may receive a stream of time stamped data packets from the acquisition engine via the USB port. The packet server may then provide the stream of data packets to the user interface as well as to one or multiple clients via a standard network protocol such as TCP/IP or UDP/IP, for example. The data stream may be formatted as ASCII text, hex data, or according to any other format. By supporting multiple clients, the packet server allows multiple users to remotely connect to the network analyzer disposed in a convenient location relative to the corresponding communication network, for example.

A packet client may be a text-only or a graphical application that displays data packets captured from multiple communication channels in a convenient and intuitive format. At least some packet client applications may include filtering functions. In some embodiments, a packet client is adapted to apply a device-specific filter to display only those data packets that travel toward or from the specified network device. Further, a packet client may communicate with multiple packet servers so that a user may, for example, view network communications in several places within the communication network. In some embodiments, a packet client supports automated or scripted testing and/or filtering.

In some embodiments, a wireless communication network analyzer adapted to simultaneously capture and process communications on multiple communication channels may include a software component executable on a conventional computer system, and a dedicated external hardware component that implements the RF interface and communicates with the software component via a standard interface such as USB, for example. In an embodiment, the software component includes both a packet server and a user interface. In other embodiments, the software component includes a packet server, and the user interface is provided as a separate component executable locally or remotely from the packet server. In yet other embodiments, the packet server alone or in combination with the user interface may be provided as a dedicated hardware component. In one such embodiment, the RF interface along with the packet server and the user interface are implemented in an embedded system.

In an embodiment, a packet controller for simultaneous processing of data packets transmitted via a plurality of communication channels includes a plurality of inputs, each to receive a respective data packet signal indicative of a presence of a data packet on a respective one of the plurality of communication channels; a clock source to continuously supply a periodic clock signal associated with a certain clock cycle; a counter communicatively coupled to the clock source to generate a clock cycle count defined as a number of instances of the clock cycle that have occurred since a reference time; and plurality of independent time stamp generators, each coupled to the counter and to a respective one of the plurality of inputs to generate a time stamp in response to receiving the respective data packet signal, such that the time stamp includes a value of the clock cycle count. Optionally, the plurality of inputs of the packet controller is a first plurality of inputs, and the packet controller further includes a second plurality of inputs, each to receive data packers from a respective one of the plurality of communication channels; and an output to output data associated with the plurality of communication channels in a first-in, first-out (FIFO) order.

In another embodiment, a serial data controller for parallel processing of a plurality of communication channels includes a master interface to exchange data with a master device, the master interface having a master output, slave input (MOSI) to receive data from the master device, a first master input, slave output (MISO) to transmit data to the master device, and a serial clock input (SCLK) to receive a master clock signal from the master device; and the serial data controller further includes a plurality of slave interfaces, each to exchange data with a respective one of a plurality of slave devices, such that each of the plurality of slave devices services a respective one of the plurality of communication channels and each of the plurality of slave interfaces having a MOSI to transmit data to the respective one of the plurality of slave devices, a MISO to receive data from the respective one of the plurality of slave devices, and an SCLK output to forward the master clock signal to the respective one of the plurality of slave devices; each of the plurality of slave interfaces further including a multiplexer having a plurality of inputs coupled to the plurality of slave interfaces, and an output coupled to the master interface, and a processing module to simultaneously process data received from each of the plurality of slave interfaces, and coupled to the multiplexer to provide the data to the master device as a single stream via the master interface. Optionally, the serial data controller further includes a mode selection input to select between at least a first mode and a second mode of operation of the serial data controller, such that the first mode is associated with transferring data from the plurality of slave interfaces to the master interface, and the second mode is associated with transferring data from the master interface to the plurality of slave interfaces. Optionally, the serial data controller receives data packets via the plurality of slave serial interfaces, and the processing module includes a clock source to supply a periodic clock signal, a counter coupled to the clock source to count a number of clock cycles of the periodic clock signal, and a plurality of first-in-first-out (FIFO) buffers, each corresponding to a respective one of the plurality of slave serial interfaces; so that the processing module generates a time stamp for each data packet received via one of the plurality of slave serial interfaces, and places each data packet and the corresponding time stamp into one of the plurality of FIFO buffers, where the one of the plurality of FIFO buffers corresponds to the one of the plurality of slave serial interfaces, and where the time stamp includes the number of clock cycles of the periodic clock signal Optionally, the master interface of the serial data controller further includes a slave device selector to select between the plurality of slave devices. Optionally, a wireless communication network analyzer includes the serial packet controller and is adapted to simultaneously capture data packets on a plurality of radio channels; the network analyzer further including a processor defining the master device, a plurality of radio transceivers defining the plurality of slave devices, each of the plurality of radio transceivers associated with a respective one of the plurality of radio channels, and a packet server stored in a computer-readable memory as a set of instructions and executing on the processor to transmit the data packets captured on the plurality of radio channels to one or more clients.

DETAILED DESCRIPTION OF THE DRAWINGS

FIG. 1 schematically illustrates a wireless network in which a wireless communication network analyzer of the present disclosure may operate, and a fragment of an example schedule according to which devices in the wireless network communicate.

DETAILED DESCRIPTION

Figure 1:
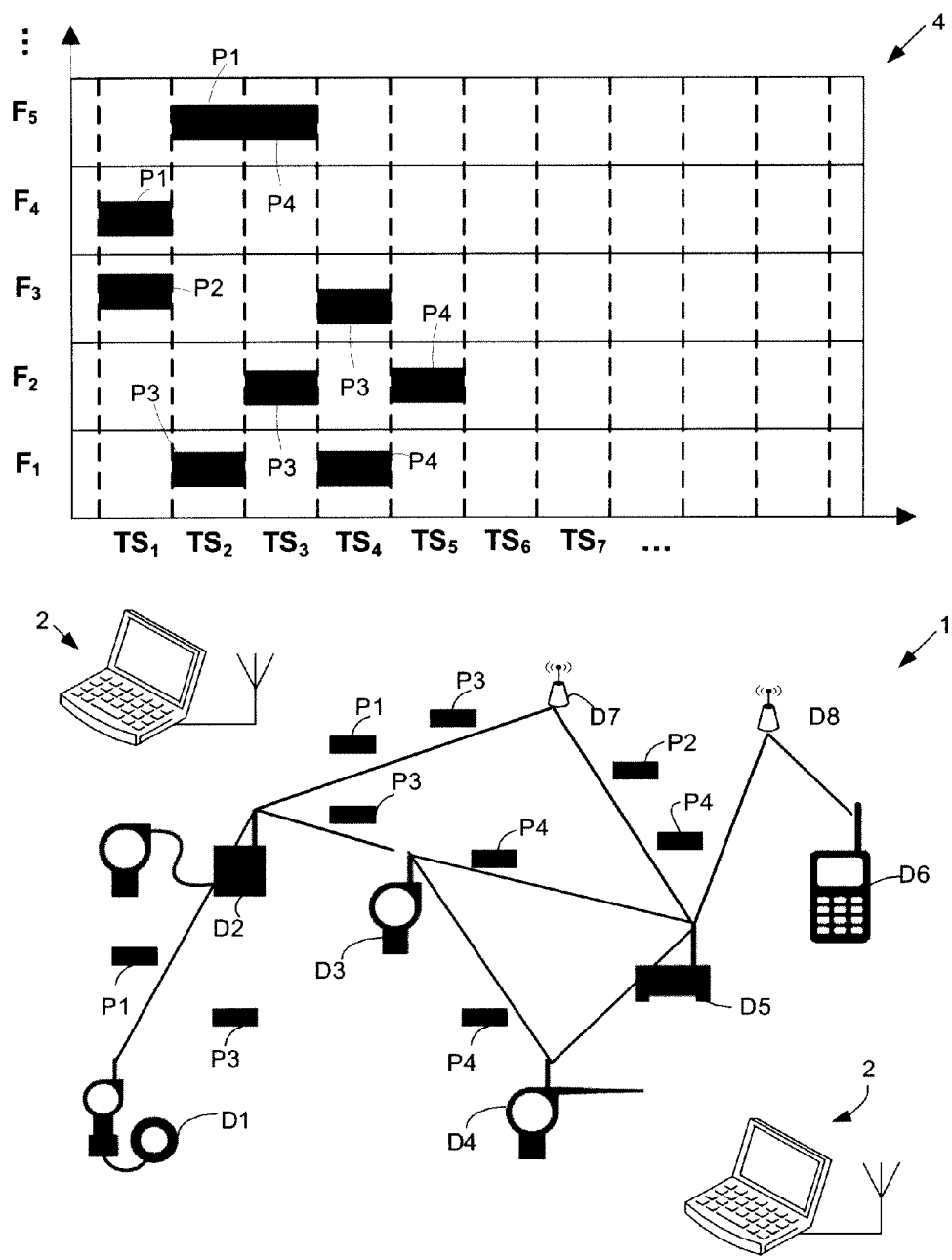

FIG. 1 illustrates an exemplary wireless network 1 in which a wireless communication network analyzer 2 may be used to capture and process data packets P1-P4 communicated by devices D1-D8. Although the wireless network 1 may be compatible with a variety of wireless protocols, the network protocol used in the embodiment illustrated FIG. 1 is a secure, wireless mesh protocol that operates in the 2.4 GHz ISM radio band, utilizes IEEE Standard 802.15.4-2006 2.4 GHz DSSS transceivers with channel hopping on a transaction-by-transaction basis, and schedules link activity using time division multiple access (TDMA). More specifically, the network protocol operating in the wireless network 1 may be the WirelessHART protocol promulgated by the HART Communication Foundation (HCF). Accordingly, devices D1-D8 in the embodiment of FIG. 1 communicate digital data using data packets of limited length, e.g., not exceeding 128 bytes, during fixed-length timeslots assigned to multiple communication channels corresponding to carrier frequencies $F_1$-$F_5$.

The devices D1-D8 support channel hopping to provide frequency diversity that, in turn, minimizes interference and reduces multi-path fading effects.

For ease of explanation, FIG. 1 also schematically illustrates a fragment 4 of a network schedule according to which the devices D1-D8 transmit and receive the data packets P1-P4. Although the schedule of the wireless network 1 generally may specify only timeslot and frequency assignment for a particular pair of communicating devices, the fragment 4 illustrates an example mapping of particular packets P1-P4 to (timeslot, frequency) tuples for atypical communication scenario in the wireless network 1. It will be also noted that although the fragment 4 illustrates assignment to only five frequencies $F_1$-$F_5$ defining five respective communication channels, the wireless network 1 may operate using fewer or more communication channels. For example, the wireless network 1 may utilize all 16 communication channels specified by 2.4 GHz IEEE Standard 802.15.4-2006.

With continued reference to FIG. 1, the packet P1 may travel from the device D1 to the device D2 during the timeslot $TS_1$ on carrier or frequency $F_4$, and from the device D2 to the device D7 during timeslot $TS_2$ on carrier $F_5$. Thus, to trace the propagation of the packet P1 from the device D1 to the device D7, it is desirable to capture communications on both carriers $F_4$ and $F_5$. As another example, the packet P3 may also travel from the device D1 to the device D7, but via an additional intermediate device D3. During timeslot $TS_2$, the packet P3 may travel from the device D1 to the device D3 on carriers $F_1$; the packet P3 may then travel to the device D2 during timeslot $TS_3$ on carrier $F_2$; and finally to the device D7 during timeslot $TS_4$ on carrier $F_3$. It will be noted that during timeslot $TS_2$, both packets P1 and P3 travel between the respective pairs of devices D2, D7 and D1, D3. Therefore, it is also desirable to capture communications simultaneously on multiple carriers.

In addition to the packets P1 and P3 that travel "upstream" relative to the device D7, some of the devices D1-D8 may similarly propagate data packets P2 and P4 "downstream" from the device D7 to the destination devices D5 and D4, respectively. As illustrated in FIG. 1, the packet P2 may travel to the device D5 during timeslot $TS_1$ on carrier $F_3$, while the packet P4 may travel may travel between the devices D7 and D5 during timeslot $TS_3$ on carrier $F_5$, between the devices D7 and D5 during timeslot $TS_4$ on carrier $F_1$, and between the devices D7 and D5 during timeslot $TS_5$ on carrier $F_2$.

During operation of the wireless network 1, the network analyzer 2 continuously and simultaneously captures communications on all channels $F_1$-$F_5$ used by the devices D1-D8. Further, the network analyzer 2 captures and maintains timing information to ensure correct TDMA operation. To this end, the network analyzer 2 may use a common clock source to time stamp communications occurring on any channel. Still further, the network analyzer 2 may record all communications to allow the network traffic to be analyzed for the purpose of assessing compliance with the network protocol used by the wireless network 1.

Users such as engineers, technicians, etc. may operate the network analyzer 2 locally or remotely via the network interface of the network analyzer 2. If desired, several instances of the network analyzer 2 may placed in several locations in the process control plant, and a user at a remote location may run a single client application that communicates with the two or more network analyzers 2. Conversely, each network analyzer 2 may support multiple client applications by assigning separate TCP or UDP ports to each instance of a packet client, for example.

Figure 2:
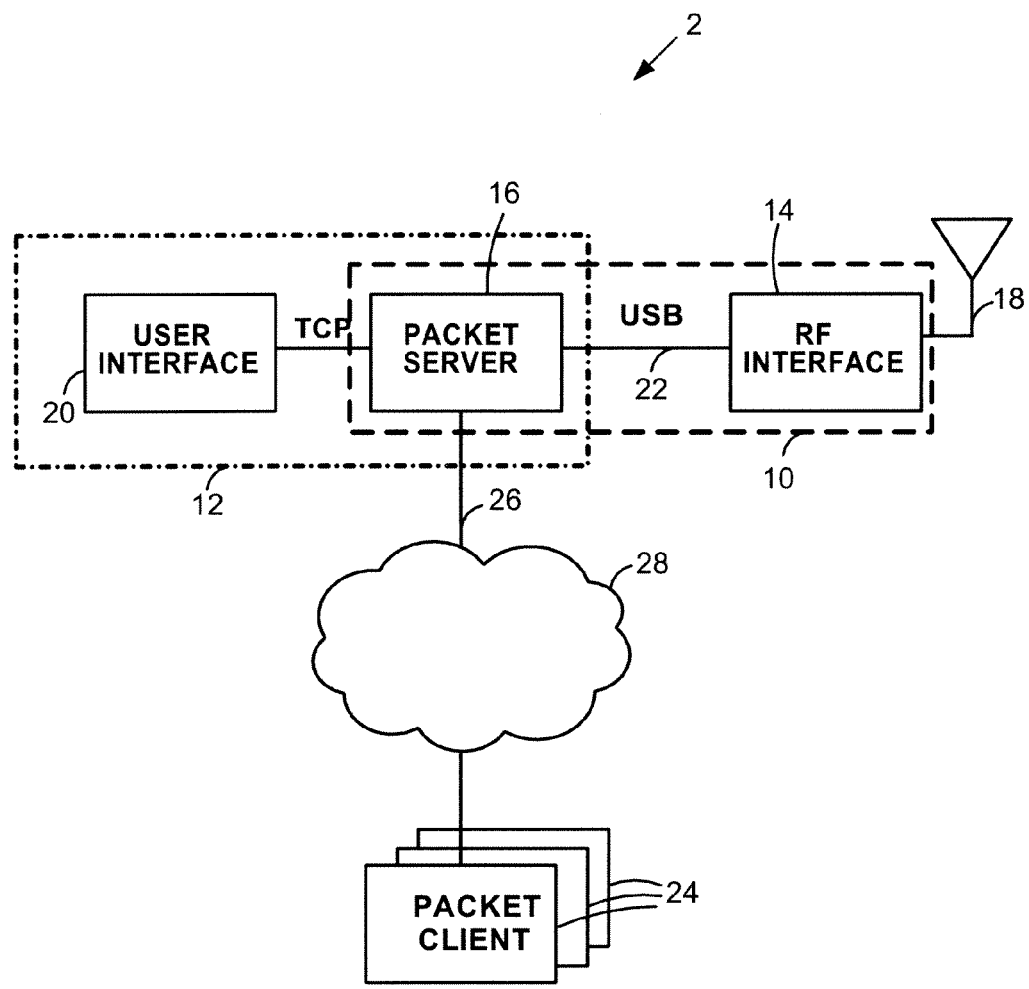
FIG. 2 is a block diagram of the network analyzer of FIG. 1.

FIG. 2 schematically illustrates example architecture of the network analyzer 2, as well as the interaction between the network analyzer 2 and one or more client applications (or "packet clients"). The network analyzer 2 includes an acquisition engine 10 partially residing on a host computer 12, which may be a laptop, another type of a standard computer system, or an embedded computer system specifically designed to support one or several components of the network analyzer 2. The acquisition engine 10 operates as a data acquisition front end for the network analyzer 2 and, as illustrated in FIG. 2, includes an RF interface 14 and a packet server 16.

The RF interface 14 includes one or more receive antennas 18 (preferably only one) and simultaneously acquires data packets on all communication channels used by the wireless network 1, e.g., on all 16 channels of a 802.15.4-compliant 2.4 GHz network protocol. The RF interface 14 time stamps the data packets upon reception, and provides the data packets to the packet server 16 for conveyance to a user interface (UI) 20 of the network analyzer 2 and/or one or multiple client applications 24 via a network interface 26 and a network 28. Preferably, the time stamps are synchronized across all communication channels with less than ±8 µS (micro-seconds) error. The time stamps also preferably have a resolution of at least 8 µS and preferably have a resolution of 1 µS. In an embodiment, the time stamp corresponds to the reception of the delimiter byte in the IEEE 802.15.4 PHY PDU. Alternatively, the time stamp may correspond to another event such as the reception of the last octet of the data packet, for example.

The connection between the RF interface 14 and the packet server 16, which is executed in the host computer 12, may be implemented using a USB connection port 22, which may be a USB 2.0 full speed (12 Mbits/sec) or a high speed (480 Mbits/sec) connection, and may comply with the appropriate USB device type profile. The RF interface 14 is preferably appropriately packaged for laboratory and non-hazardous plant floor use. The packaging should also be appropriate for accompaniment by a laptop host computer. Further, packaging should ensure that all 16 channels can be received equally well. Thus, for example, there should not be more variance than ±3 dBm in received signal sensitivity between any of the 16 channels.

The packet server 16 may be a simple console application that connects to and supports the RF interface 14. The basic control of the packet server 16 may be implemented via command-line options. Once launched, the packet server 16 connects to the specified RF interface 14 via the USB port 22 and waits for the user interface 20 to connect to the packet server 16 via a predefined control port, for example. The packet server 16 may also support one or several data ports to which the user interface 20 and/or the client applications 24 may connect to retrieve data captured at the RF interface 14. Alternatively, the interaction between the packet server 16 and the UI may be implemented remote procedure calls (RPCs) or other inter-task communication techniques supported by the operating system executing on the host 12. Preferably, both the packet server 16 and the user interface 20 are compatible with Microsoft® Windows 2000, XP, or Vista, as well as with Linux, QNX, and other operating systems.

As discussed in greater detail below, the packet server 16 may support a set of commands which the user may enter directly via the command-line interface or via the user interface 20. Once the user interface 20 successfully connects to the packet server 16, the user may transmit the "START" to the packet server 16 to initiate transfer of data from the RF interface 14 to the user interface 20. The data transfer may continue until the packet server 16 receives the "STOP" command, or until the UI application 20 disconnects.

Still referring to FIG. 2, at least one of the packet clients 24 may be a packet analyzer that displays, filters, and analyzes the data packets and the statistics captured and collected at the RF interface 14 and forwarded by the packet server 16. Preferably, the packet analyzer understands both IEEE 802.15.4 and WirelessHART packet structures. During operation, the packet analyzer may convert the binary fields in the data packets into legible human-readable display. Further, the packet analyzer may parse the captured data packets into the separate fields, and optionally display the text included in or corresponding to the fields to simplify the human analysis and understanding of the communications between the devices D1-D8.

In an embodiment, the packet analyzer 24 may run on the same compute host 12, and connect to the packet server 16 locally. Alternatively, the packet analyzer 24 may run on another host and connect to the packet server 16 remotely, as illustrated in FIG. 2. Thus, the RF interface 14 and the packet server 16 may be located at a plant site, and the packet analyzer 24 can conveniently connect to the packet server 16 from a service center to remotely troubleshoot the operation of the wireless network 1.

As indicated above, the packet analyzer 24 can also connect to multiple packet servers 16 simultaneously (see FIG. 1 in which two instances of the network analyzer 2 are disposed at two different locations within the process plant in which the wireless network 1 operates). Moreover, each packet server 16 may support multiple RF interfaces 14. As a result, data from several geographically distributed RF interfaces 14 can be combined on one display to provide a comprehensive view of the entire RF space occupied by the wireless network 1.

Figure 3:
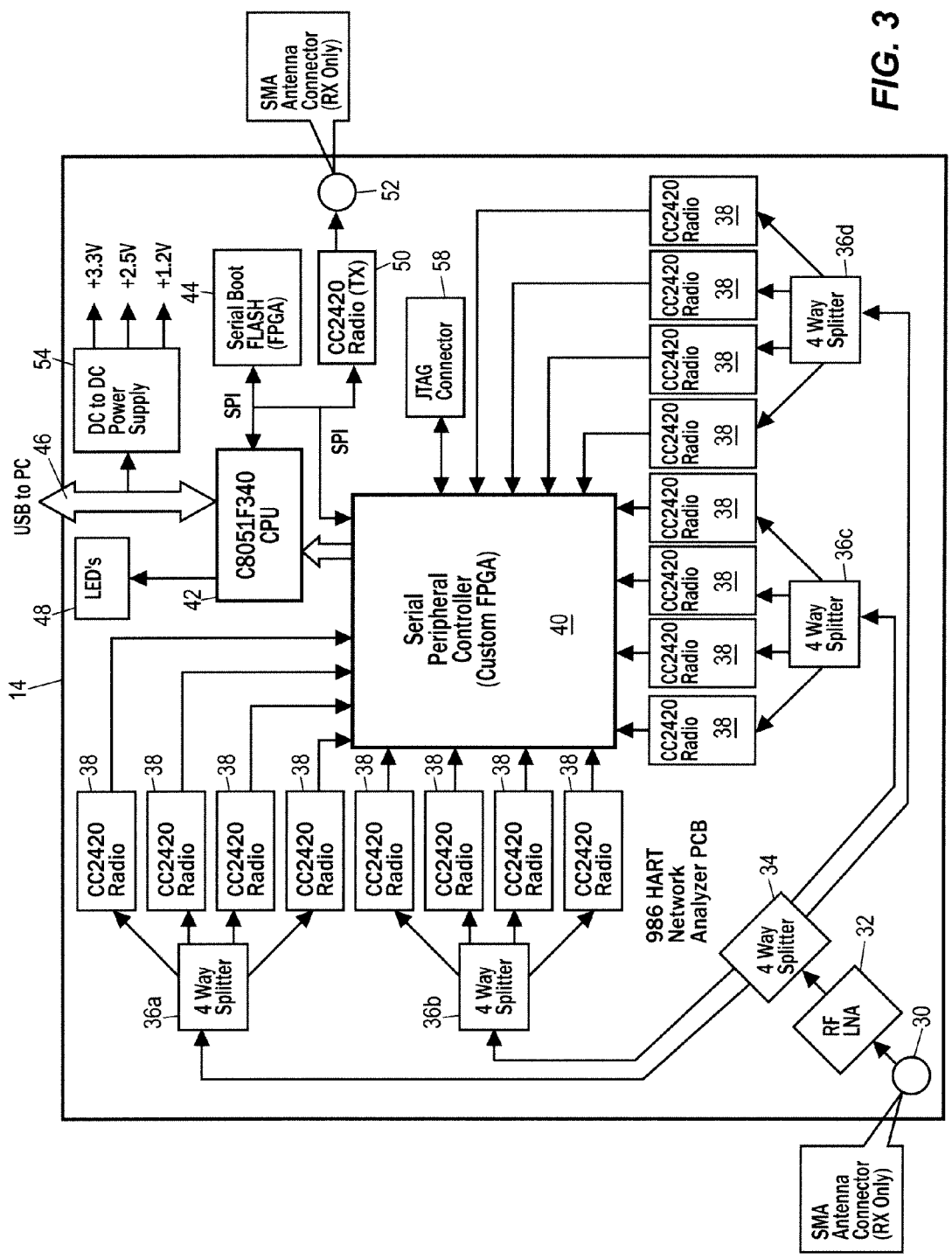
FIG. 3 is a circuit board component diagram for an RF interface of the network analyzer illustrated in FIG. 1.
Figure 4:
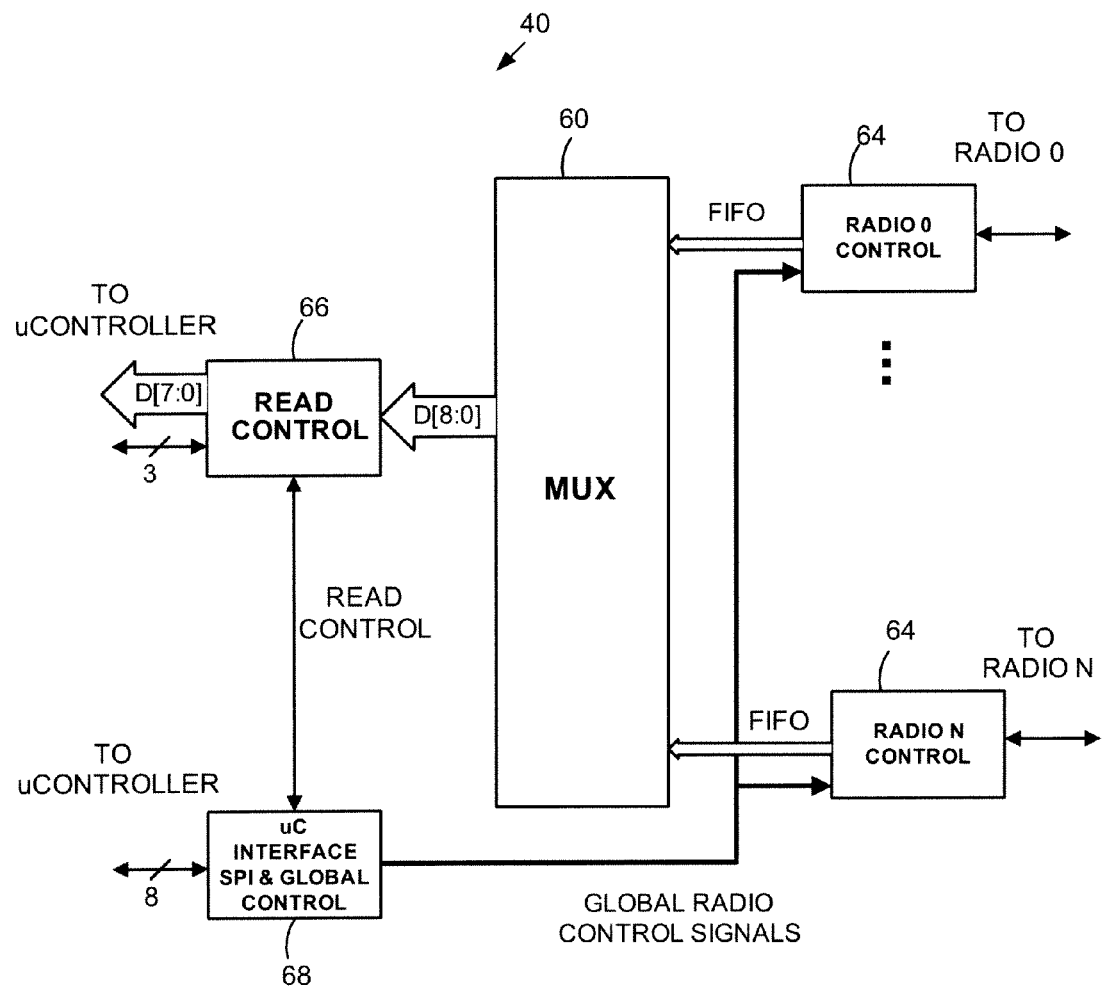
FIG. 4 is a block diagram of a signal peripheral controller of the RF interface of FIG. 3.
Figure 5:
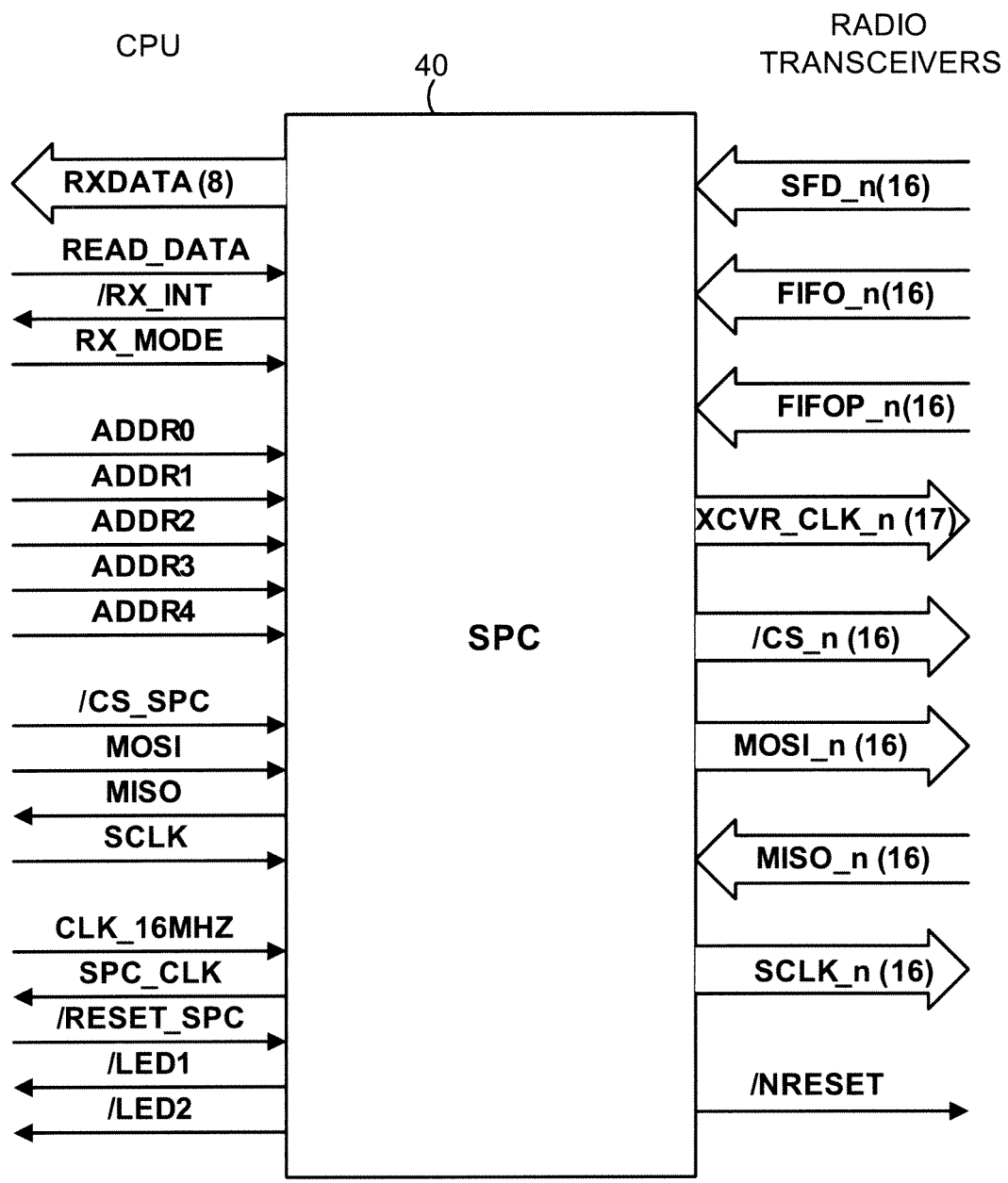
FIG. 5 is a signal diagram for the signal peripheral controller of FIG. 3.
Figure 6A:
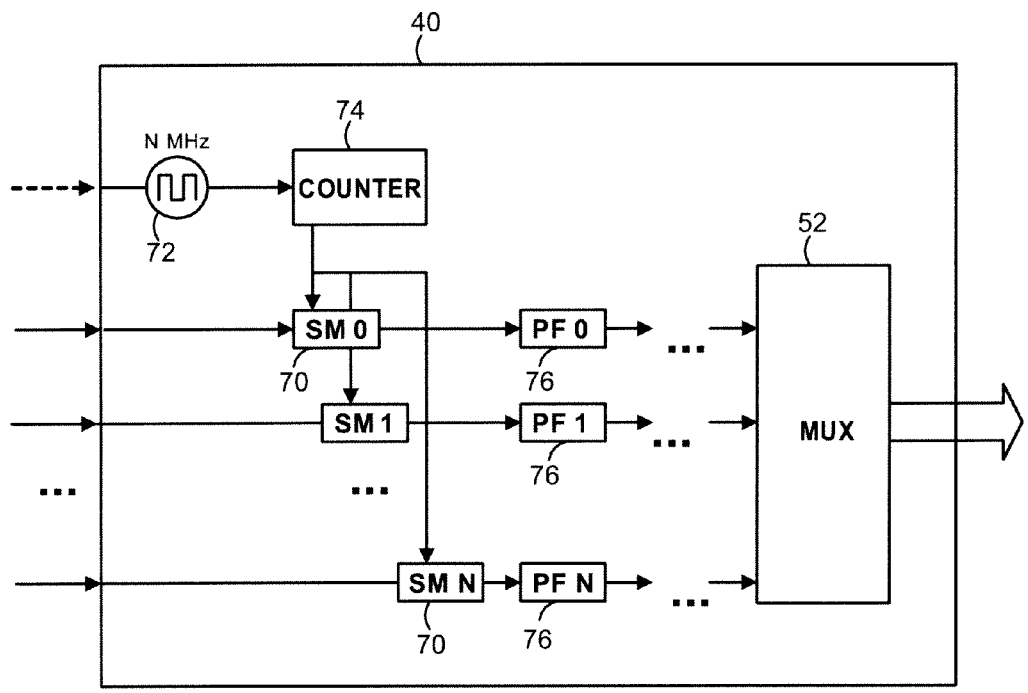
FIG. 6A is a block diagram of a state machine interaction of the signal peripheral controller of the RF interface of FIG. 3.
Figure 6B:
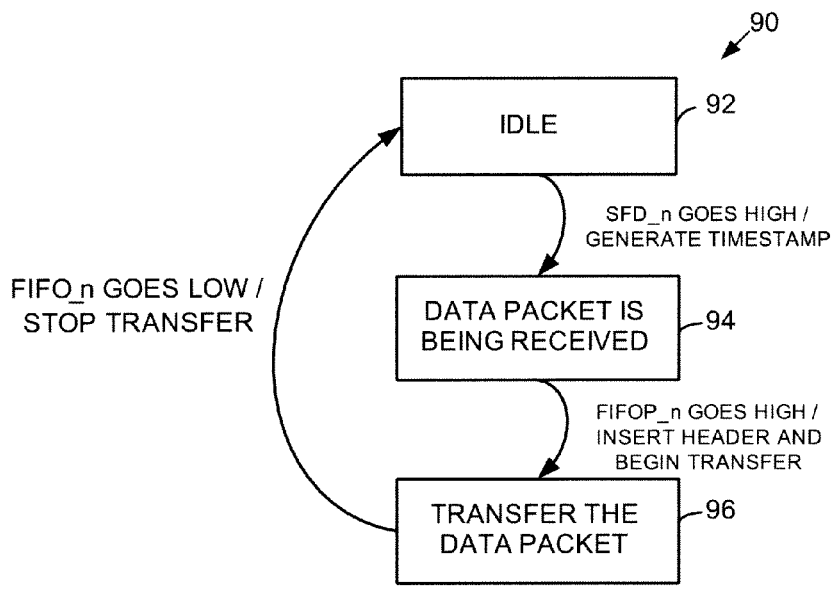
FIG. 6B is a state transition diagram which several independent state machines operating in the signal peripheral controller of the RF interface of FIG. 3 may execute to service a particular communication channel.
Figure 7:
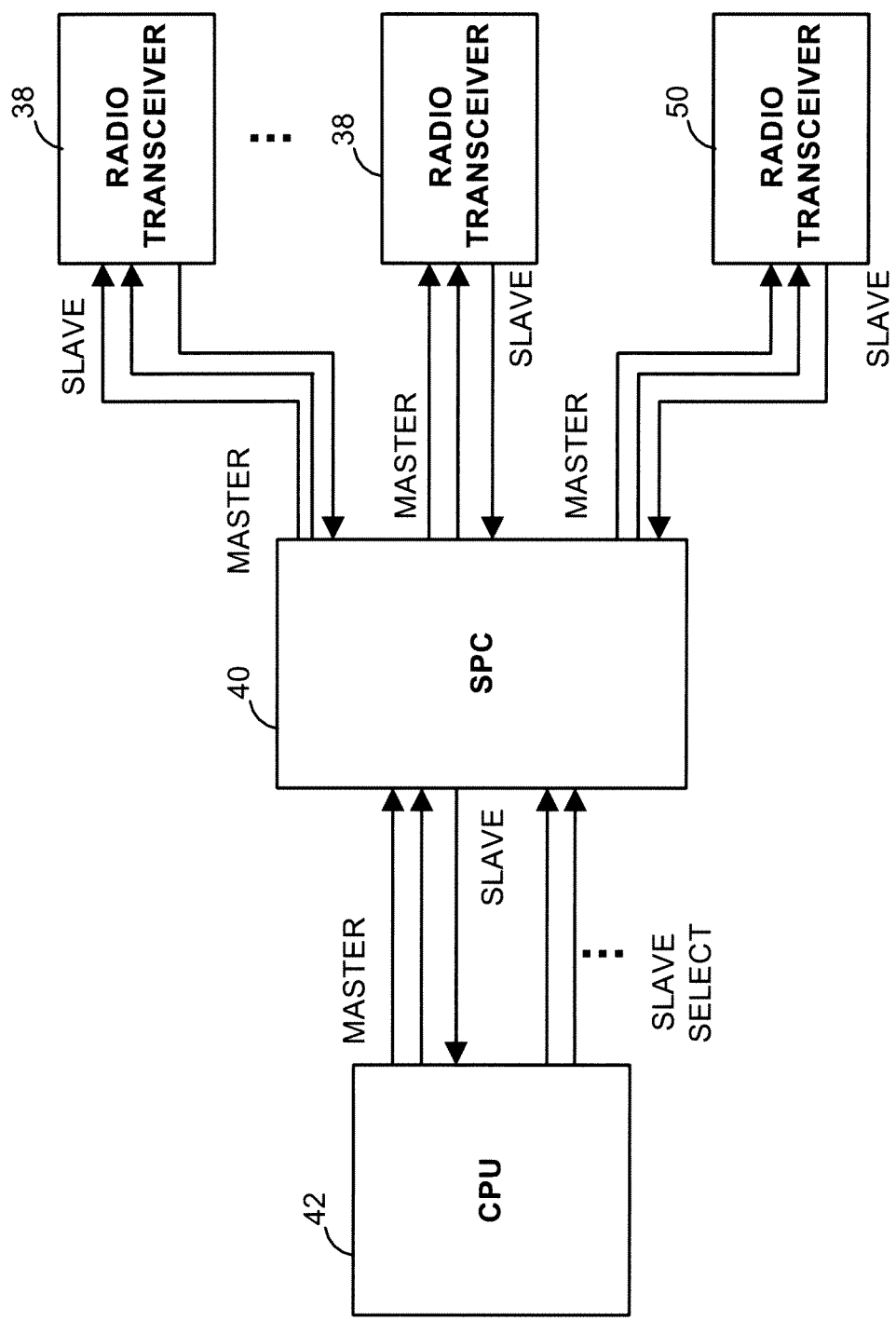
FIG. 7 is a block diagram of a serial peripheral interface interaction of the signal peripheral controller of the RF interface of FIG. 3.
Figure 8:
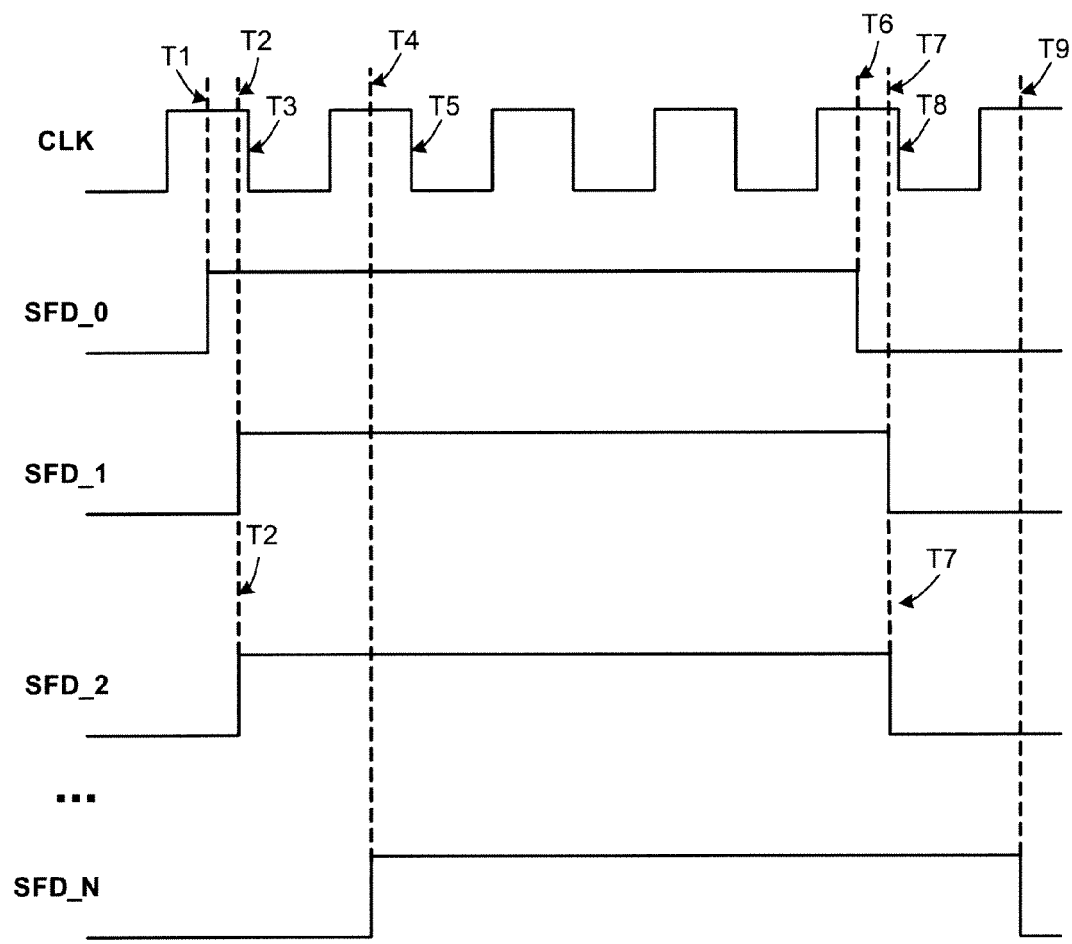
FIG. 8 is a timing diagram of an example scenario in which the network analyzer of FIG. 1 captures several data packets on different communication channels.

Next, FIGS. 3-8 illustrate various components of the RF interface 14 in several embodiments, as well as the interactions between these components from various perspectives to better explain the operation of the RF interface 14. In particular, FIG. 3 illustrates an example circuit board component diagram of the RF interface 14; FIGS. 4 and 5 provide a high-level diagram and a signal diagram, respectively, of one of the components of the RF interface 14; FIGS. 6A-B and 7 illustrate the same component from the perspectives of state machine execution and serial peripheral interface (SPI) operation, respectively; and FIG. 8 illustrates an example signal transmission path of one of the embodiments of the RF interface 14.

Referring to FIG. 3, the RF interface 14 may include an SMA antenna connector 30 coupled to an RF low noise amplifier (LNA) 32, which in turn is connected to a 4-way signal splitter 34. Each of the outputs of the signal splitter 34 is provided to one of a set of 4-way signal splitters 36a, 36b, 36c, or 36d. Likewise, each output of the signal splitters 36a-36d is provided to a radio transceiver 38, each of which receives and decodes a single radio channel associated with the respective frequency $F_n$. Thus, multiple radio transceivers 38 may be incorporated into a single circuit on a single circuit board. Further, the radio transceivers 38, which may be implemented using CC2420 chips, provide a decoded output to a serial peripheral controller (SPC) 40 which may include an FPGA module, which may be a Xilinx XC3S1000-FT256 chip. The SPC 40 stores these data steams in a set of first-in-first-out (FIFO) buffers or memories, which may be implemented within the SPC 40 or in a separate memory chip. The RF interface 14 also includes a central processing unit (CPU) 42 which is connected to the serial peripheral controller 40 to receive processed data streams and operates to provide these data steams to the packet server 16 (see FIG. 2). A serial boot flash memory 44 may store a boot program used to boot up the CPU 42 upon power up and may provide additional non-volatile memory for the SPC 40.

The CPU 42 may be connected to the host computer 12 (see FIG. 2) via a USB connection 46 and may be connected to drive one or more light emitting diodes (LEDs) 48, which may serve as a diagnostic, status or operational interface on the RF interface 14. An additional radio transceiver 50, which may also be implemented as a CC2420 chip, is connected to the CPU 42 and to an SMA antenna connector 52 and may be used as a transmit radio. During operation, the receive antenna 18 (see FIG. 2) may be connected to the connector 30 and a transmit antenna (not shown) may be connected to the connector 52. These antennas may be, for example, whip antennas. The CPU 42 may drive the radio transceiver 50 to transmit to the WirelessHART network. However, if desired, the radio transceiver 50 may be connected to the serial peripheral controller 40 via an SPI connection to allow the radio transceiver 50 to be used as an additional receiver.

As illustrated in FIG. 3, a DC to DC power supply 54 is coupled to the USB connection 46 to receive power on the USB connection 46, and operates to convert the USB power to the power levels needed by the CPU 42, the serial peripheral controller 40, the radio transceivers 38, 50, the LNA 32 and other powered components on the RF interface 14. As illustrated in FIG. 2, the power supply 54 may provide 3.3 volt, 2.5 volt and 1.2 volt power signals, although other power levels may be provided as well or instead. Still further, the RF interface 14 may include a JTAG connector 58 to allow programming, diagnostics or other access to the serial peripheral controller 40.

In general, the SPC 40 may perform several functions in the radio interface 14. On the one hand, the purpose of the SPC 40 is to provide separate SPI interfaces to each of the 16 802.15.4 radio transceivers 38, as well as to the transceiver 50. The SPC 40 may operate as an SPI master device relative to the transceivers 38 and 50, and as a slave device relative to the CPU 42. On the other hand, the FPGA of the SPC 40 also provides first-in-first-out (FIFO) buffering, channel selection, start of packet time stamping and a parallel interface to the CPU 42 for capturing packet data. In addition, the FPGA of the SPC 40 includes an interface from the CPU 40 for reading and writing all radio and internal FPGA registers as needed.

Referring to FIG. 4, the SPC 40 in one embodiment may include a multiplexer 60 to which several radio control modules 64 provide respective inputs. Each of the radio control modules 64 may control and maintain a separate FIFO queue to store data packets received at a corresponding transceiver 38. As explained in more detail with respect to FIG. 7, the radio control modules 64 implement independent state machines driven by a common clock signal, provided by the CPU or another clock source. As a result, radio control modules 64 are able to generate accurate time stamps in parallel and independently of each other. When the radio control modules 64 provide data packets to the CPU 42 via the multiplexer and a read control module 66, these independently generated time stamps permit accurate subsequent processing irrespective of the order in which data packets, received simultaneously or almost simultaneously on different channels, are supplied to the CPU 42 from the multiplexer 60. Upon receiving one or several data packets, the read control module 66 may notify the CPU 42 via an interrupt, for example, prior to outputting the one or several data packets to the CPU 42. Additionally, each of the radio control modules 64 may interact with an SPI interface and global control module 68 to receive control or configuration data to be forwarded to a respective radio transceiver 38.

FIG. 5 illustrates a signal diagram of the SPC 40. In this embodiment, the SPC 40 includes a transceiver interface and a CPU interface, each of which may be implemented as a set of input and output pins to respectively receive and transmit electronic signals. Some signals in the diagram of FIG. 5 are named using the physical channel number as a postfix, e.g., SFD_n, where n is the physical channel number from 0 to 15. For the purposes of clarity, these signals are named using the physical channel number rather than the actual 802.15.4 frequency channel numbers of 11 to 26. In the discussion of FIG. 5 below, the terms "pin" and "signal" are used interchangeably.

On the transceiver interface, signals MOSI_n, MISO_n, and SCLK_n may define a synchronous serial data link consistent with the SPI architecture for each transceiver 38.

Figure 11A:
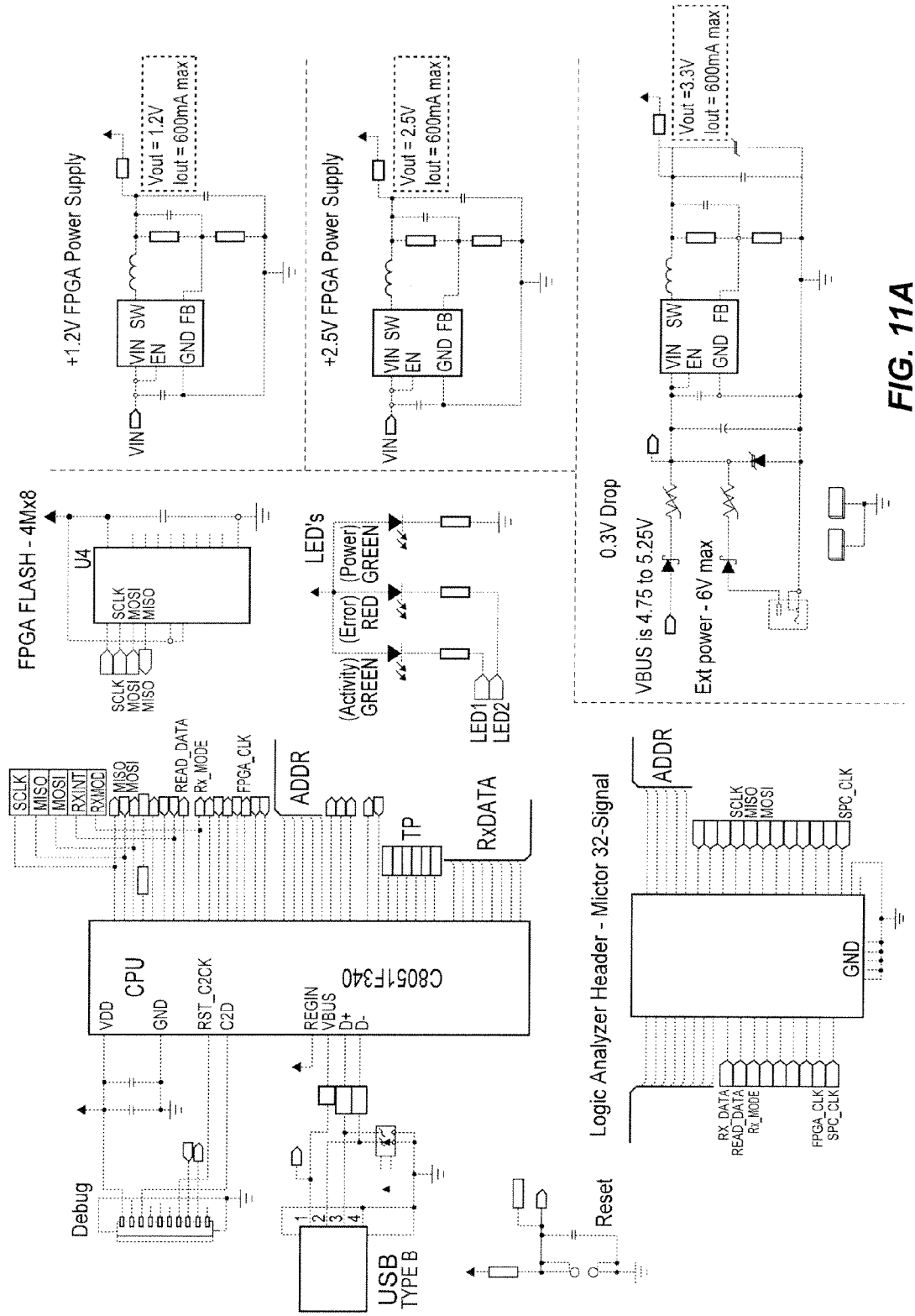
Figure 11B:
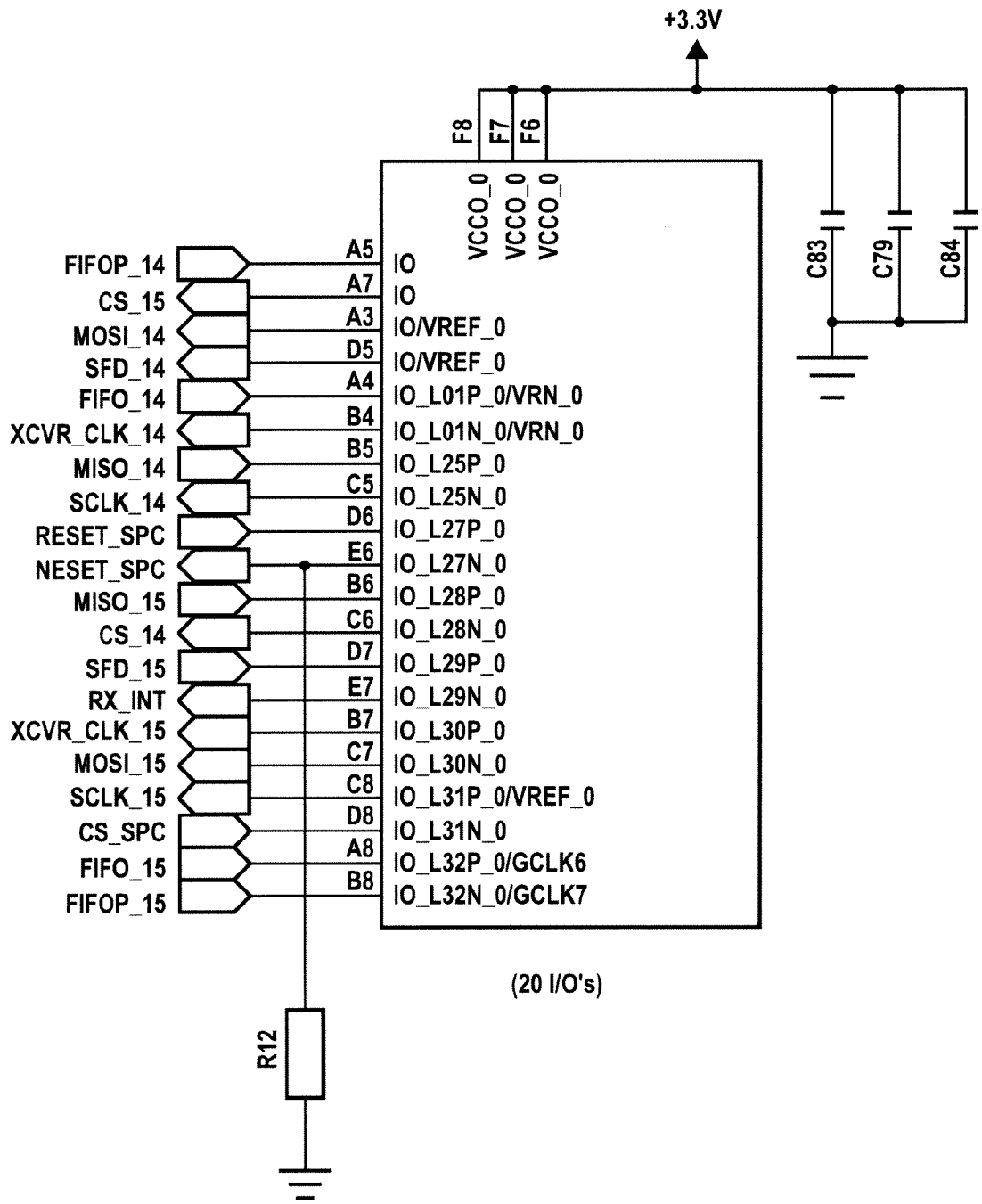
Figure 12:
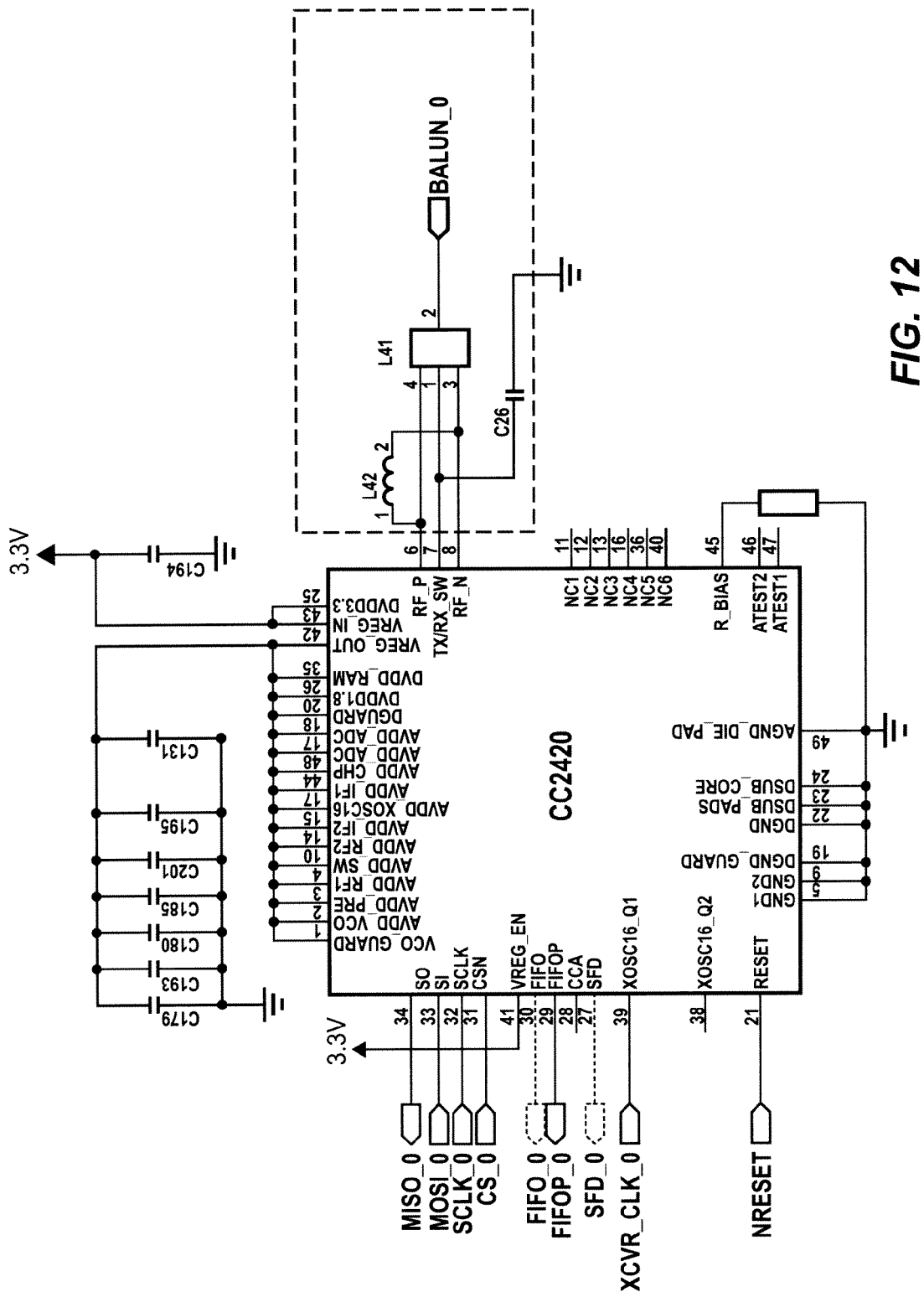
Figure 13:
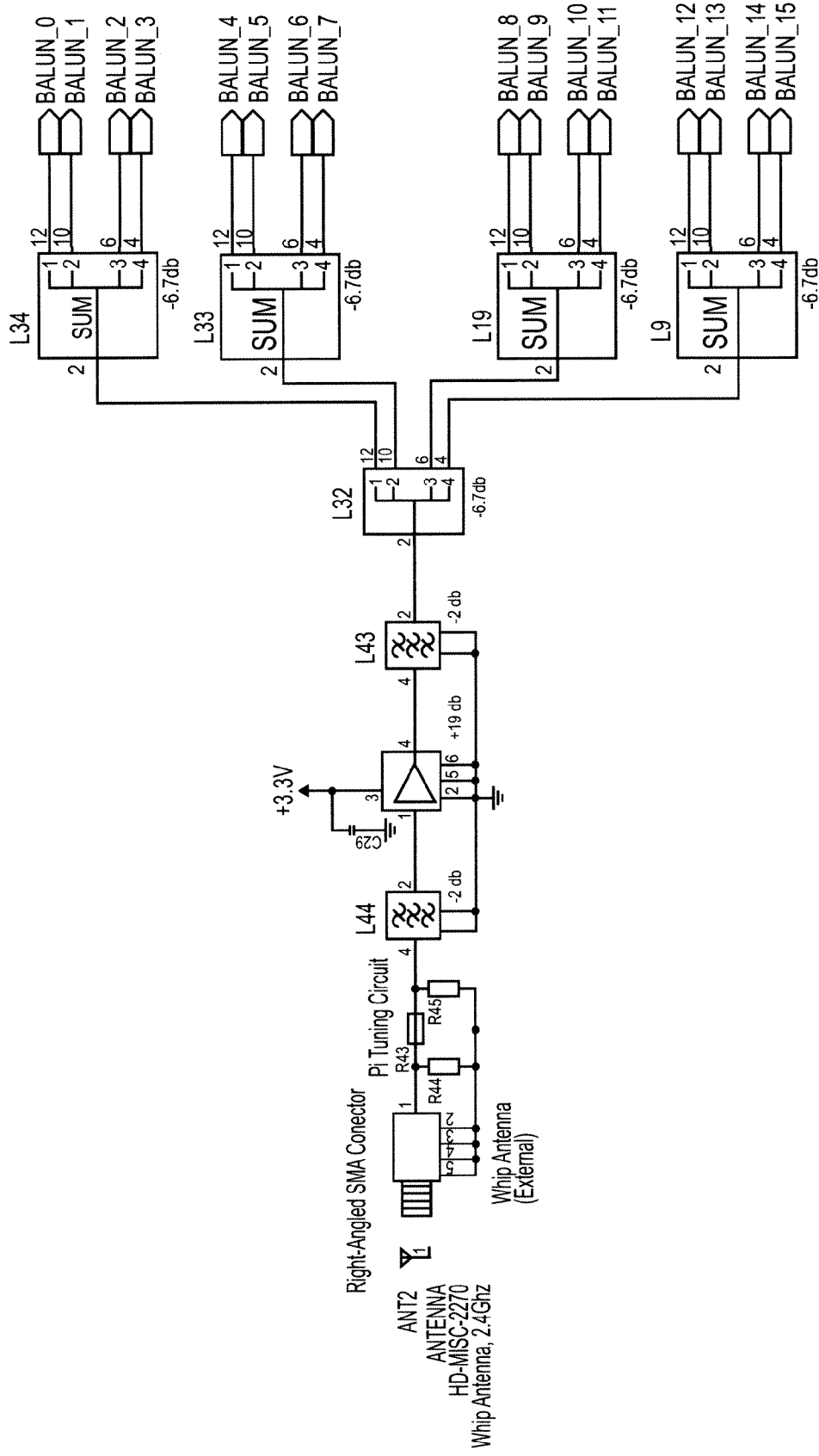

Signals SFD_n, FIFO_n and FIFOP_n may be used to drive independent state machines responsible for time stamping data packets, as well for initiating and stopping packet data transfer from the transceivers 38 (state machine implementation is discussed in detail with reference to FIGS. 6 and 11). Further, signals XCVR_CLK_n may be used to forward a clock signal to each transceiver 38. Still further, the transceiver interface may include CS_n signals to select a particular transceiver 38 chip, and a single outbound reset signal /NRESET which may be sent to all of the transceivers 38.

Regarding the CPU interface of the SPC 40, eight RXDATA pins are used to transfer a byte to the CPU 42 from a FIFO memory or buffer associated with a certain communication channel within the SPC 40, the READ_DATA signal is used to advance the readout to the next byte, and the /RX_INT signal is used to generate an interrupt that notifies the CPU 42 that data is available in one of the FIFO buffers in the SPC 40. The five pins ADDR[5:0] are used to select one of the transceivers 38 or one of the internal registers of the SPC 40, as discussed in more detail below. Further with respect to the CPU interface, signals MOSI, MISO, and SCLK define an SPI interface in which the CPU 42 operates as a master device and the SPC 40 operates as a slave device. Still further, the /CS_SPC signal provides the CPU 42 with access to any register within the SPC 40; the /LED1 and /LED2 signals are used to control respective light-emitting diodes to indicate network activity or errors, and may be connected to the CPU 42 so that the CPU 42 can read the LED states directly; the /CLK_16 MHZ signal is used to supply a clock signal from the CPU 42 and the SPC_CLK is used for monitoring the internal clock of the SPC 40; and the /RESET_SPC signal from the CPU 42 may reset all or some of the data and/or internal states of the SPC 40.

In general, the SPC 40 may operate in one of two fundamental modes, a setup mode and a receive mode, selectable via the RX_MODE pin. The setup mode is used to initialize the radio transceivers 38, 50 and to transmit packet data for testing, while the receive mode is used to capture data packets on all 16 channels simultaneously with a separate SPI bus for each radio transceiver 38. To enter the setup mode, the RX_MODE pin may be set to 0, for example.

More particularly, the network analyzer 2 may initially program each radio transceiver 38 using the setup mode. First, one of the 16 channels is selected using a set of ADDR [3:0] pins and setting an ADDR4 pin low. These five pins are some of the inputs to the SPC 40 when the SPC 40 is in the setup mode. Next, a normal SPI cycle is performed using the SPI engine run on the CPU 42. A set of /CS_SPC, MOSI, MISO and SCLK signals are automatically routed through the SPC 40 to the radio transceiver 38 associated with the addressed channel. Thus, in the setup mode, the SPC 40 can forward signals associated with standard SPI communications between the CPU 42 and the selected one of the transceivers 38. For maximum flexibility, the /CS_SPC signal timing is generated by software via a GPIO port in output mode.

In the setup mode, all of the registers of the selected radio transceiver 38 are programmed, and each transceiver 38 is set to a different one of the 16 frequency channels defined by the 802.15.4 specification. As the last step performed in the setup mode, the network analyzer 2 may write the 16-bit channel enable register within the SPC 40 to indicate which ones of the 16 channels are actually enabled in the receive mode. Once this step is completed, the RX_MODE pin is set to 1 to enter the receive mode.

In addition to selecting one of the radio transceivers 38 via the ADDR[3:0] pins and transmitting control or configuration data to the selected transceiver 38, the CPU 42 may directly access the internal registers of the SPC 40 via the /CS_SPC signal by setting ADDR4 signal high, for example. In this scenario, the ADDR[3:0] pins may be used to select one of the 16 internal registers of the SPC 40. In some embodiments, the internal registers are all 16-bits wide. The exact functions of the registers of the SPC 40 in one embodiment are defined in the table below.

| Register # | Name | Function | Format |
|---|---|---|---|
| 0 | Channel Enable (Read/Write) | Selects which channels are in receive mode after RX_MODE is set to 1 | Bit 15 (MSB) = 1, channel 16 is enabled . . . Bit 0 (LSB) = 1, channel 0 is enabled |
| 1 | Status (Read Only) | Reports internal FIFO overflows and/or Radio FIFO overflows | Bit 0 = Radio RX FIFO Overflow Bit 1 = SPC RX FIFO Overflow |
| 4 | Packet Counte Channel Address (Write Only) | Set to select Counter to be read back in register 5 | Bit 0 to 3 - counter # to be read Bit 4 - Read Packet Counter or Discarded Packet Counter |
| 5 | Read Counter (Read Only) | Read back Packet Counter addressed by register 4 | 16-bit Packet Counter |
| 6 | Debug register 6 (read only) | Read back Debug Info | Variable |
| 7 | Debug register 7 (read only) | Read back Debug Info | Variable |
| 15 | FPGA Firmware Version | Read back SPC Firmware Version | Read 0x0100 means Version 1.00 |

In an embodiment, the register data is clocked in on the positive-edge of the SCLK signal and is saved in the appropriate register when /CS_SPC goes high.

In the receive mode, an independent state machine within the SPC 40 processes data packets from a respective transceiver 38, and generates time stamps for each received data packet. The transceiver 38 may forward all layers of the captured data packet to the SPC 40, including the PHY header and possibly the preamble. When the RX_MODE pin is set to 1, the SPC 40 automatically sends a command (SRX-ON) to each enabled radio transceiver 38 (identifiable using the channel enable register 0 as described in the table above) to start reception. The operation of the SPC 40 in the receive mode, as well as the components used in the receive mode, are discussed next with reference to FIGS. 6A and 6B and continued reference to the signal diagram of FIG. 5.

Normally, each radio transceiver 38 is set to a different one of the set of communication channels used to transmit data packets in the network 1. As indicated above, the network analyzer 2 may thus capture communications occurring on all communication channels of the network 1. However, the network analyzer 2 preferably permits the user to program any of the radio transceivers 38 via the user interface 20 to operate on any 802.15.4 channel. As one example, the user may configure all radio transceivers 38 of the RF interface 14 to receive communications on the same channel in order to determine the RSSI signal strength variance between communication channels. This mode of operation is referred to below as the calibration mode.

As indicated above, the CPU 42 and the SPC 40 use the signals RXDATA[7:0], READ_DATA and /RX-INT to transfer data packets to the CPU 42 and, in particular, the RXDATA pins are used to read a byte from a corresponding FIFO buffer. When transitioning from the receive mode back to the setup mode (i.e., RX-MODE pin goes low), the SPC 40 may automatically clear all of the internal states related to the receive mode, and flushes all FIFO buffers.

FIG. 6A schematically illustrates signaling related to independent state machines 70 that operate in the receive mode of the SPC 40. Each of the state machines 70 is connected to and services a respective radio transceiver 38. Referring back to FIG. 4, the independent state machines 70 may be a component of a respective independent radio control module 54. In particular, each independent state machine 70 may be responsible for generating a time stamp in response to detecting the beginning of a data packet, initiating the transfer of a data packet from the corresponding radio transceiver 38 in response to detecting the end of the data packet, and stopping data transfer in response to detecting that the entire data packet has been transferred to the channel-specific internal buffer of the SPC 40 from the radio transceiver 38. A state transition diagram of the state machine 70 in accordance with one embodiment is illustrated in, and discussed in more detail with reference to FIG. 6B.

Still referring to FIG. 6A, a clock source 72 provides a periodic clock signal to a counter 74, which may be a 40-bit integer counter, for example. The clock source 72 may be an accurate, low drift crystal with a resolution and accuracy of 1 microsecond over an interval of greater than 12.7 days. If desired, the clock source 72 may be provided separately from the SPC 40 to provide a clock signal to the SPC 40 via a dedicated pin, for example. Each state machine 70 is communicatively coupled to the counter 74 so that a time stamp for a data packet received from any of the transceivers 38 may be generated immediately upon detecting the beginning of the data packet at the corresponding transceiver 38, and irrespective of the number of packets detected on other communication channels. Each state machine 70 may operate a respective packet formatter 76 (which may be another component of the radio control module 54 illustrated in FIG. 4). The packet formatter 76 may append, prepend, or otherwise attach the current value of the counter 74 (defining the time stamp) to the data packet prior to adding the data packet to the corresponding FIFO queue or buffer. Alternatively, the SPC 40 may include only one packet formatter, and the state machine 70 may cause the current value of the counter 74 to be stored in a register or buffer for subsequent use by the packet formatter. It will be noted that in general, only some of the processing of data packets needs to proceed in parallel on all communication channels. As yet another alternative, the SPC 40 may include multiple counters 74 driven by a common clock signal.

Each of the state machines 70 may operate according to a state transition diagram 90 illustrated in FIG. 6B. In this embodiment, the state transition diagram 90 includes an idle state during which the SPC 40 is neither transferring data packets from the corresponding transceiver 38, nor is registering the reception of a new data packet at the transceiver 38. The state machine 70 may transition to state 94, in which a new data packet is being received at the transceiver 38, when the corresponding SFD_n signal goes from 0 to 1. For example, the transceiver 38 tuned to the frequency $F_3$ (see FIG. 1) associated with communication channel 3 may detect a preamble of a packet on the physical layer of the 802.15.4 protocol stack, followed by a start frame delimiter (SFD) field indicating the start of the data packet. Upon detecting the frame delimiter, the transceiver 38 may immediately output a 1 on the outbound SFD pin of the transceiver 38. Because the transceiver 38 in this example is associated with communication channel 3, the SPC 40 receives a 1 on SFD_3 coupled to a state machine 70 that services the communication channel 3.

In the notation used in FIG. 6B, the event that triggers the transaction indicated by an arrow is listed to the left of the forward slash, and the action performed in response to the event prior to entering the new state is listed to the right of the forward slash. Thus, as illustrated in FIG. 6B, the state machine 70 may generate the time stamp in response to detecting that the corresponding SFD_n signal is now 1. In a sense, the SFD_n signal is used to "freeze" the packet time stamp for the corresponding communication channel. Once the last byte of the packet is received, the transceiver 38 changes the FIFOP_n signal to high. This signal causes the state machine 70 to generate a packet header, initiate an SPI transfer in order to read the data packet bytes from the radio FIFO buffer, and transition to state 96. In an embodiment, each channel-specific FIFO buffer may be 2 Kb deep.

Prior to retrieving a data packet in the state 96, the SPC 40 may generate a header identifying the channel on which the data packet was received and a 5-byte long time stamp. The SPC 40 may insert the generated header into the corresponding FIFO buffer ahead of the data packet to be retrieved from the transceiver 38 in state 96. In some embodiments, the packet header data format may be defined as follows:

| 0 | 1 | 2 | 3 | 4 | 5 |
|---|---|---|---|---|---|
| Channel | TS Byte 4 MSB | TS Byte 3 | TS Byte 2 | TS Byte 1 | TS Byte 0 LSB |

According to this example format, the lower nibble of the channel byte is in the range 0 to 15 to indicate the physical channel of the packet. The software of the network analyzer 2 may map this physical channel to the 802.15.4 channel in the setup mode. The upper nibble of the channel byte carries a copy of the status bits from SPC Register #1 defined above. The time stamp is preferably a 40-bit value with a resolution of 1 microsecond per bit. This resolution allows a packet capture period of more than 12.7 days without wrapping. The time stamp counter is set to 0 when the SPC 40 is reset at power-up.

In state 96, the state machine 70 may retrieve the data packet available at the transceiver 38. In other embodiments, the state machine 70 may read multiple data packets in state 96 without transitioning back to state 92 after each reception. However, time stamp generation and insertion may need to be adjusted accordingly. In general, the transfer in state 96 may occur via the corresponding SPI interface (i.e., MISO_n, MOSI_n, and SCLK_n pins).

In the example network 1 that implements WirelessHART, the packet data is up to 128 bytes in length. The first byte indicates the length in bytes of the rest of the packet. The SPC state machine first reads the length byte and uses it to read the remaining bytes of the packet. Alternatively, the SPC 40 can just read the bytes from the radio transceiver 38 until the FIFO_n pin goes low indicating that there are no more bytes to read.

If desired, the SPC 40 may also append a length check byte at the end of a data packet stored in the corresponding FIFO. This additional byte is used for synchronization purposes and validation of packet boundaries. Any packets with a length byte greater than 127 may be considered invalid and can be discarded. When a discard occurs, a packet discard counter may be incremented. Packets with valid lengths but with cyclical redundancy check (CRC) errors also may be captured. The last byte of the packet may include a bit that indicates whether the packet had a CRC error.

Once the packet has been received, time stamped and stored in the appropriate channel-specific FIFO memory, the SPC 40 may proceed to notify the CPU 42 that new data is available for retrieval and subsequent processing by packet server 16 and, ultimately by one of the packet clients 24 (see FIG. 1). To this end, the SPC 40 may generate an interrupt by asserting the /RX-INT pin. The CPU 42 may respond by reading a byte of the packet via the RXDATA[7:0] pins, toggling the READ_DATA pin to advance the FIFO readout to the next byte, checking to see whether the /RX_INT pin is still asserted (i.e., checking whether the entire data packet has been transferred), and continuing to retrieve individual bytes of the data packet until the /RX_INT pin is de-asserted.

In some embodiments, to ensure that the CPU 42 can detect the de-asserted /RX-INT pin before the next interrupt comes in, the SPC 40 waits to issue any pending interrupts until after the READ_DATA signal is toggled one additional time by the CPU 42.

Further, the SPC 40 may be adapted to efficiently and safely handle overflows. Although the SPC 40 is preferably fast enough to avoid an overflow under normal conditions, an overflow may still occur if, for example, one of the transceivers 38 receives a data packet longer than the maximum length of 128 bytes. In this case, an overflow may be indicated by the FIFO_n signal going low after FIFOP_n goes high at the end of the data packet. In an embodiment, the SPC 40 detects this condition and issues a command to the corresponding transceiver 38 to flush the associated FIFO memory and to resume operation. In this case, some data in the FIFO buffer is lost and the corresponding time stamp is not used. This condition could be reported using, for example, one of the LEDs 48 on a pin from the SPC 40, if desired.

Further with respect to clock signals used to drive the state machines 70, the clock source 72 (see FIG. 6A0) may be the CLK-16 MHz input pin. This signal may be highly accurate clock (+−1.5 ppm), and may be also used to drive the time stamp counter 74 and the XCVR_CLK_[16:0] signals. In this case, the SPC 40 may be simply used as a distribution buffer for the XCVR_CLK_n outputs. The extra XCVR_CLK_16 signal may go to the radio transceiver 50, if desired.

Further, the SPC_CLK output pin may be the internal clock used by the state machines 70. This signal is preferably a 40 MHz clock generated by an internal phase locked loop (PLL) of the SPC 40, and this clock signal may be output at pin for SPC_CLK testing purposes.

As indicated above, the CPU 42 may also completely reset the SPC 40 by issuing a low pulse on the /RESET_SPC input. In this case, the SPC 40 may set the one or more counters 70, the internal registers, and all of the internal FIFO buffers to zero. The SPC 40 may also reset all of the state machines to the idle state. The SPC 40 may also send a single /NRESET signal to all of the transceivers 38. Preferably, this signal is pulsed low when the SPC 40 is reset via the /RESET_SPC signal.

When operating in the calibration mode, the network analyzer 2 may tune all transceivers 38 to the same carrier frequency. The RF interface 14 may then receive the same control signal on every communication channel, measure the RSL on each communication channel, and use the obtained RSL measurements to compensate for variations in channel-specific signal attenuation in subsequent processing. In other words, the network analyzer 2 may operate the transceivers 38 on the same frequency in order to reduce or completely cancel out channel-to-channel variations in receiver sensitivity, and thus efficiently and accurately calibrate the RF interface 14. The control signal may include actual data packets transmitted by the devices D1-D7 in the network 1, or a signal from a control transmitter. In one embodiment, the network analyzer 2 may use the transceiver 50 to generate the control signal having a controlled strength and/or other parameters. It will be appreciated that accurate calibration of the RF interface 14 across multiple communication channels allows the network analyzer 2 to estimate the strength of the signal emitted by a device under test (e.g., one of the devices D1-D7 illustrated in FIG. 1).

Next, FIG. 7 illustrates the interaction between the CPU 42, the SPC 40, and the transceivers 38 and 50 from the perspective of serial interface signaling. In particular, FIG. 7 illustrates only those pins or signals that are related to serial interface signaling, and omits other pins or signals for clarity of illustration. It will be appreciated that the CPU 42 in FIG. 7 operates as a master device relative to the SPC 40 which, in turn, operates as a master device relative to transceivers 38 and 50. Although the CPU 42 operates with a single slave device (SPC 40), the CPU interface of the SPC 40 includes ADDR pins (see FIG. 5) that operate as slave selection signals. As discussed above, the configuration illustrated in FIG. 7 advantageously permits the SPC 40 to provide buffering, parallel processing, time stamping, independent management of FIFO queues dedicated to individual channels, etc.

From the foregoing, it will be appreciated that the radio interface 14 in general, and the SPC 40 in particular, permit the client applications 24 (see FIG. 1) to receive accurate information regarding the timing of data packets transmitted in the network 1. Whereas a conventional processor can only service multiple data streams in a pseudo-parallel manner, i.e., by slicing the CPU time, the SPC 40 registers critical information such as time stamps on multiple communication channels in a genuinely parallel manner. As is known, parallel processing on a conventional processor typically involves slicing the available CPU time into multiple periods for use by parallel task, and switching between the tasks (i.e., "context switching") according to some algorithm or selection principle. In this sense, parallel processing is only quasi-parallel, in that the CPU only performs one task at a given point in time.

To better illustrate some of the advantages associated with this approach, FIG. 8 illustrates a timing diagram in which a data packet is received at the time T1 on communication channel 0, as indicated by the SFD_0 signal going high at the time T1, and another two data packets are simultaneously received at the time T2 on communication channels 1 and 2, respectively. If a packet processor such as the SPC 40 is used, the arrival of data packets on communication channels 0, 1, and 2 may be detected at the time T3, if transitions occur on the falling edge of the clock signal. Thus, all three data packets may acquire the same time stamp even though these three data packets arrive within a single cycle of the CLK signal.

In general, the time stamp accuracy may be limited to the resolution of the CLK signal. The data packet detected on communication channel N at the time T4 may accordingly acquire a time stamp associated with the time T5 different from the time T3, while the data packets detected on communication channels 1 and 2 acquire the same time stamp at the time T3 despite the difference between the times T1 and T2.

Further, it will be noted that the SPC 40 need not trigger time stamping at the beginning of the delimiter field. If, for example, all packets are known to use the same format of the PHY preamble and/or header, the SPC 40 may trigger using other signals, or different transitions of the same signals, received from the transceivers 38. For example, the relative accuracy of time stamps can be the same if the SPC 40 were to trigger on the transition of SFD_n from high to low at the times T6, T7, or T9.

Figure 9:
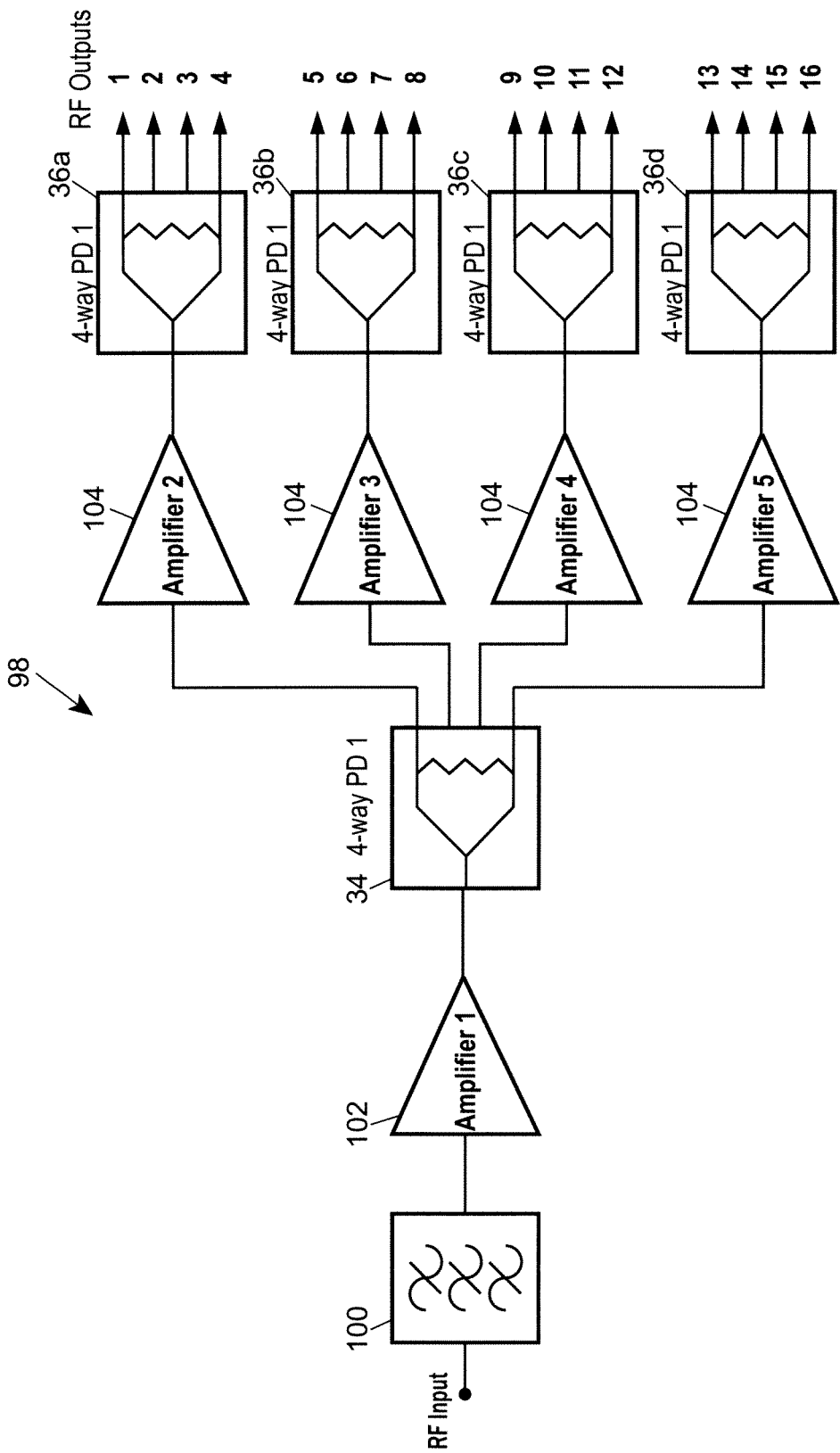
FIG. 9 is a block diagram of a receive signal transmission path for an alternative embodiment of the RF interface of FIG. 3.
Figure 10:
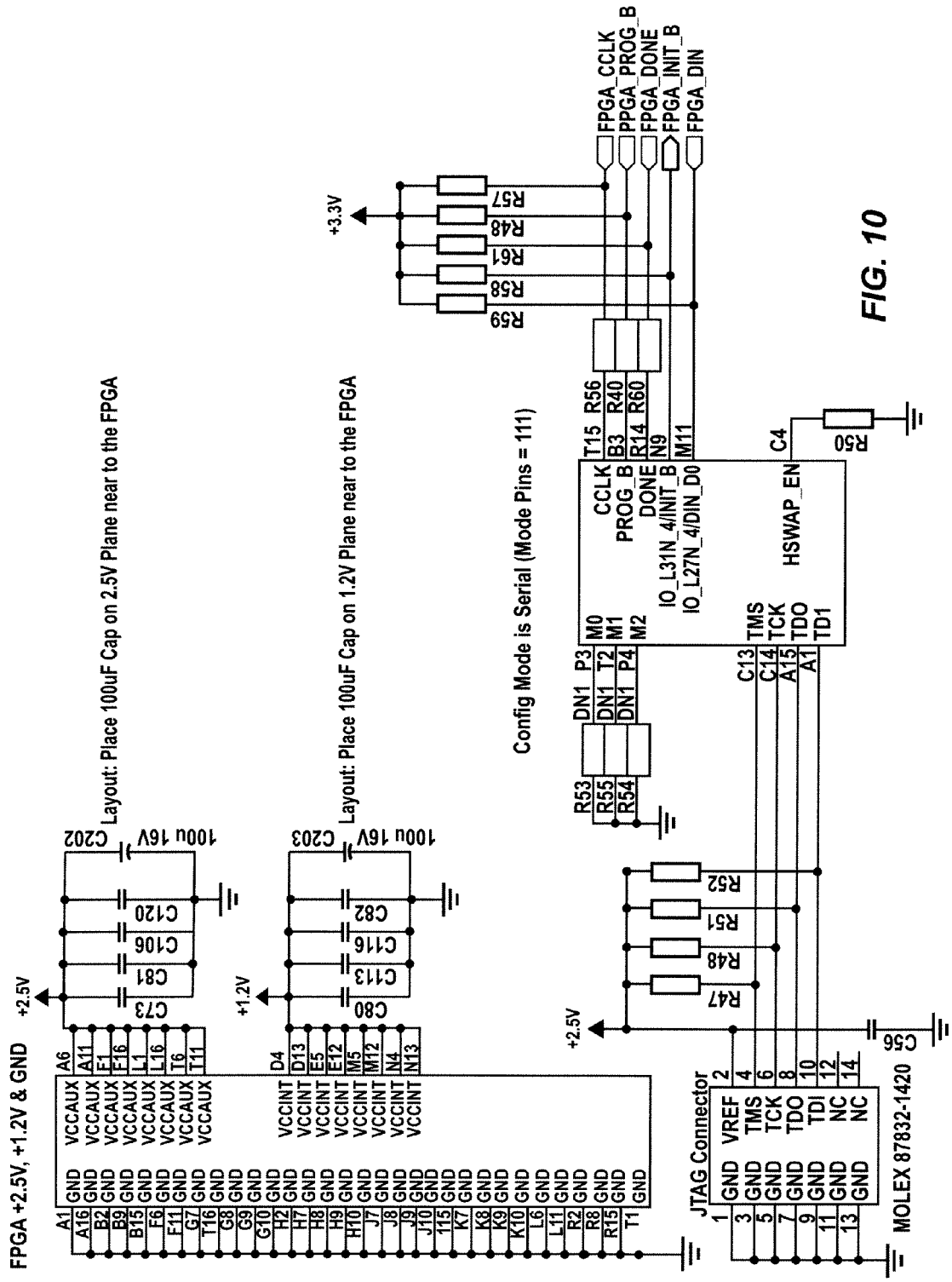
FIGS. 10-13 illustrate circuit diagrams for various components of the RF interface of FIG. 3.

Next, FIG. 9 illustrates another embodiment of the RF signaling path which may be used in the network analyzer 2. Although different from the embodiment of FIG. 3, the configuration illustrated in FIG. 9 also allows the network analyzer 2 to use of a single antenna. While FIG. 3 illustrates a configuration in which a single band pass filter and high gain amplifier 32 is used to process the RF signals received across the 802.15.4 spectrum, FIG. 9 illustrates an alternative RF signal path 98 in which a single bandpass filter 100 is disposed between the RF input and a first stage amplifier 102 which drives the first 4-way splitter 34. Second stage amplifiers 104 are then provided between the splitter 34 and the 4-way splitters 36a-36d. However, it appears to be easier to drive the single amplifier 32 of FIG. 3 using the USB power than the five separate amplifiers illustrated in FIG. 9. Furthermore, it is desirable to use a balun for coupling the radios 38 to the antenna coupler itself with a low part count. One possible balun requires only two components instead of seven.

In an embodiment, the SPC 40 may include a Xilinx XC3S1000-FT256 FPGA in which the serial slave mode configuration is implemented. In this mode, the CPU 42 controls loading the FPGA code via the CCLK, DIN, DONE, INIT_B & PROG_B pins on the FPGA. The code itself is stored in the serial flash 44 connected to the CPU 42. The CPU 42 is required to download the FPCA code at power-up time. More details may be found in the Xilinx Application Note (XAPP502) on using a microprocessor to configure a Xilinx FPGA. Further, the radio transceivers 38 may be TI/Chipcon CC2420 chips and the FPCA may be customized to use the signal interface of this transceiver. FIGS. 10-13 illustrate circuit diagrams for various components of the RF interface 14, at least some of which include the CC2420 chips.

From the foregoing, it will be appreciated that the radio interface 14 discussed with reference to FIGS. 3-9 provides a number of important advantages including, for example, simultaneous capture of communications on multiple communication channels, parallel processing of captured streams (and, in particular, accurate-time stamping), ability to capture all layers of a data packet including the physical layer, etc. Because multiple data streams are processed using the same clock signal, time synchronization across all 16 channels is assured and accurate time stamps are generated upon PHY delimiter reception. Moreover, the RF interface 14 may operate using a single antenna to simultaneously capture data packets on 16 communication channels or more, if desired. In general, it is also possible to use multiple antennas and, at least in theory, a separate antenna such as a chip antenna may be provided for each communication channel. However, testing has revealed that placing relatively many antennas proximately to each produces significant interference, sometimes enough to cause the network analyzer 2 to occasionally drop packets.

Referring back to FIG. 2, the architecture of the network analyzer 2 efficiently separates tasks into those that are optimally performed by hardware or firmware, and those that are best performed by software. Thus, the packet analyzer or a similar packet client 24 performs the "heavy lifting" of decoding data packets, processing user commands, displaying data packets textually and/or graphically, etc. Further, the packet server 16 of FIG. 1 is designed so that data packets are conveyed from the RF interface 14 to the user interface application 20 and are formatted accordingly. The command line arguments for the packet server 16 may be as follows:

p port

Server port used to establish a bi-directional configuration and control connection to a packet client 24 and/or the user interface 20 (default: 1024)

l descriptor

ISO 639 specified language descriptor string (default: "en").

d

Run in debug mode taking input from stdin and sending the capture packets to stdout. The capture is stopped by sending a ^C via stdin. If this option is not specified, the message server will wait for control commands on the control port before starting the capture O stdout file name with optional path (default: "analysaeout.txt")

G stdlog file name with optional path (default: "analysaelog.txt")

E stderr file name with optional path (default: "analysaeerr.txt")

The user interface 20 and the packet server 16 may use a TCP data port and a TCP control port to communicate with each other. In operation, the user interface 20 may first assess the connection port for the application configuration and control. In one embodiment, the control port at "localhost" is the TCP port "ANALYS_WH_UI_CONNECT" (localhost refers to the host computer 12 on which the acquisition engine 10 is executing, and ANALYS_WH_UI_CONNECT is a compile-time constant for the default port number).

After the user interface 20 connects to the packet server 16 of the acquisition engine 10 via the ANALYS_WH_UI_CONNECT port, the other uni-directional data port number may be provided as a decimal number in ASCII text form. A negative number may indicate a stream allocation error or some other error condition. The user interface 20 may also display a list of USB devices attached to the packet server 16.

The user interface 20 can send configuration and control commands to the packet server 16 using the configuration and control ports. If the message server 16 accepts the command, it preferably responds with an acknowledgement. If the command contains an error or if the packet server 16 is unable to complete the command for some reason, the packet server 16 preferably responds with a negative acknowledgement along with a string of text specifying the reason. The table below provides an example set of control port commands the packet server 16 may recognize:

| Command | Description |
| --- | --- |
| LIST_DEVICES | Get a list of devices connected to the message server. Response is the device number (dd) and the serial number/id of device (dd) |
| START dd | Start the data stream through the data port for device dd |
| STOP dd | Stop the data stream through the data port for device dd |
| FILTER | Filter parameters |

During operation of the network analyzer 2, the acquisition engine 10 may provide a data stream to the user interface 20 and/or the packet clients 24 that includes data packets captured on several wireless channels as well as additional information useful in device and network diagnostics. For example, the data stream may include some or all of the fields Description (e.g., "802.15.4-DATA"), Packet Number (e.g., a continuously increasing 32-bit number to keep track of each captured packet), Date and Time, Timestamp, RSL, Packet Status, Channel, Byte Stream, USB Device Number. Additionally, the data stream may include a field USB Device Number to specify the USB device on which the packet was captured.

In some embodiments, the Date and Time field includes the ISO 8601 date string, a space character, and the ISO 8601 time string. The second field is immediately followed by a decimal point and the number of milliseconds. This configuration is similar to the output of the standard ANSI C library function strftime invoked with the format string of "% Y-% m-% d % H: % M: % S" with the addition of the milliseconds. Meanwhile, the field Elapsed Time may contain the number of milliseconds since the acquisition system was last reset. The elapsed time is reported every 8 µS and may have an accuracy of at least 8 µS. The time is preferably represented as a floating point number with three digits to the right of the decimal point. The value should not overflow for at least 48 hours.

The RSL field may indicate the receive signal level for each packet, included to provide an estimate of a power level (in dB) of the signal for the received packet. This value may be represented and stored as a signed integer between −128 and +127.

Further, the Packet Status may be an unsigned, 16-bit enumerated status of the packet. The status may indicate the following values, for example: bit 0—Packet FCS Error; Bit 1—Bad receive byte count; Bit 2—Receiver overflow. Bits 3-15 are reserved.

Still further, the field Channel contains the decimal channel number as per the IEEE 802.15.4-2006 specifications. The field byte Stream preferably contains all of the bytes received in the data packet. Each byte may be separated by a space character and includes 2 hexadecimal characters.

In general, all fields may be ASCII text separated by a comma, and the packet is preferably terminated by a line feed. An example of the resulting stream is:
1, 802.15.4-DATA, 10523, 2007-07-16 14:04:31.261, 6581973.929, −14, 0x0000, 23, 5B 41 88 2C 11 00 . . . equivalent).

Figure 14:
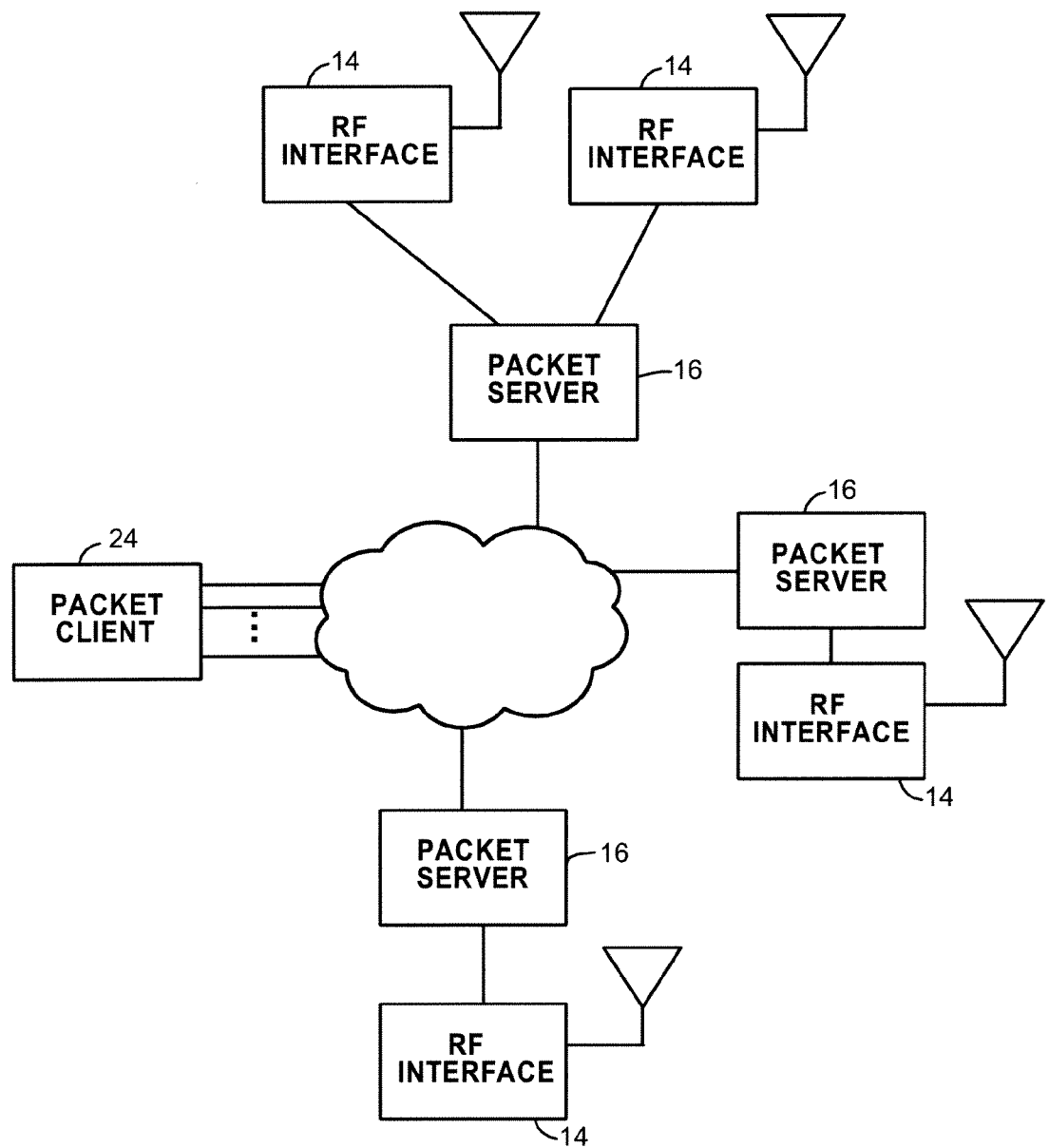
FIG. 14 is a block diagram of a packet client that operates with multiple packet servers of the network analyzer of FIG. 1.

FIG. 14 provides another example of an advantageous configuration of components of the network analyzer 2. In this embodiment, a packet client 24 connects to multiple instances of the packet server 16. Each packet server 16 transmits a stream of data packets to the packet client 24 so that the packet client 24 can conveniently display information from multiple physical locations. Moreover, some packet servers 16 may connect to multiple RF interfaces, as also illustrated in FIG. 14. Thus, a single packet client 24 can collect a relatively large amount of information related to multiple communication channels and physical locations.

Because the packet client 24 illustrated in FIG. 14 may collect a relatively large amount of data, filtering functions may be further provided to select data packets based on various criteria such as transmission from or reception at a particular device. Referring back to FIG. 1, for example, an operator may wish to see all data packets traveling through the device D2. He or she may accordingly select the appropriate filter and apply the selected filter to block all packets unrelated to D2. It is contemplated that this function may be particularly useful when verifying compliance of a particular device to the protocol (e.g., WirelessHART) of the network 1.

It is also contemplated that the network analyzer 2 may be used for automated test execution as well as test annotation. In particular, the packet server 16 may be provisioned to execute predefined test scenarios in response to corresponding commands from a packet client 24. In other words, the network analyzer 2 can process data packets addressed to the network analyzer 2 itself. For example, packets can be used to instruct the network analyzer 2 to start and stop recording data; to specify the name of the file to record the data; to provide cryptographic keys in use during the test may be used, etc. The network analyzer 2 may create a specific directory (e.g., on a memory disk of the host 12) to which the packet server 16 may direct data packets collected in the course of executing the particular test scenario. In this manner, the amount of information which a human operator has to analyze manually may be significantly reduced.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A packet controller for simultaneous processing of data packets transmitted via a plurality of communication channels, the packet controller comprising:

a plurality of inputs to receive a respective plurality of data packet start signals from a plurality of transceivers, each of the plurality of data packet start signals being indicative of a start of reception of a data packet by a respective one of the plurality of transceivers on a respective one of the plurality of communication channels;

a clock source to supply a periodic clock signal;
a plurality of independent processing modules coupled to the respective plurality of inputs to simultaneously process the plurality of data packet start signals, wherein each of the plurality of independent processing modules implements a respective state machine driven by the periodic clock signal to process a respective data packet start signal independently of every other one of the plurality of processing modules;
an output to transmit an output signal indicative of a presence of at least one data packet on one or more of the plurality of communication channels; and a mode selection input to receive a selection signal from a processor to select between at least a receive mode and a control mode of operation of the packet controller, wherein:
the receive mode corresponds to receiving data packets from the plurality of transceivers and forwarding the received data packets to the processor, and
the control mode corresponds to receiving control data from the processor and forwarding the received control data to a specified one of the plurality of transceivers.

2. The packet controller of claim 1, further comprising a counter communicatively coupled to each of the plurality of independent processing modules and to the clock source to count a number of clock cycles of the periodic clock signal that have occurred since a reference time.

3. The packet controller of claim 2, wherein each of the plurality of independent processing modules uses the counter to generate a time stamp for each data packet detected on the respective one of the plurality of communication channels.

4. The packet controller of claim 1, wherein the clock source is a first clock source, and the periodic clock signal is a first periodic clock signal associated with a first clock cycle duration; and wherein the packet controller further comprises:
a second clock source to continuously supply a second periodic clock signal associated with a second clock cycle duration shorter than the first clock cycle duration;
wherein the first periodic clock signal drives state transitions of each of the plurality of independent processing modules, and the second periodic clock is used to execute instructions in each of the plurality of independent processing modules.

5. The packet controller of claim 1, wherein the plurality of inputs is a first plurality of inputs, and the packet controller further comprises a second plurality of inputs to receive a respective plurality of data packet end signals from the plurality of transceivers, each of the plurality of data packet end signals being indicative of an end of reception of the data packet by the respective one of the plurality of transceivers on the respective one of the plurality of communication channels.

6. The packet controller of claim 1, wherein the plurality of inputs is a first plurality of inputs, and the packet controller further comprises:
a second plurality of inputs to receive a respective plurality of data packet signals from the plurality of transceivers, each of the plurality of data packet signals conveying the data packet received by the respective one of the plurality of transceivers on the respective one of the plurality of communication channels;
a multiplexer coupled to the plurality of independent processing modules; and
an output coupled to the multiplexer to transmit the data packets received on the plurality of communication channels.

7. The packet controller of claim 1, further comprising:
a control data input to receive control data for the plurality of transceivers; and
a selection input to receive a selection of one of the plurality of transceivers; wherein the packet controller forwards the control data to the selected one of the plurality of transceivers.

8. A packet controller for simultaneous processing of data packets transmitted via a plurality of communication channels, the packet controller comprising:
a plurality of inputs to receive a respective plurality of data packet start signals from a plurality of transceivers, each of the plurality of data packet start signals being indicative of a start of reception of a data packet by a respective one of the plurality of transceivers on a respective one of the plurality of communication channels;
a clock source to supply a periodic clock signal;
a plurality of independent processing modules coupled to the respective plurality of inputs to simultaneously process the plurality of data packet start signals, wherein each of the plurality of independent processing modules implements a respective state machine driven by the periodic clock signal to process a respective data packet start signal independently of every other one of the plurality of processing modules;
an output to transmit an output signal indicative of a presence of at least one data packet on one or more of the plurality of communication channels;
a master serial parallel interface (SPI) coupled to exchange data with a processor, the master SPI including:
a master output, slave input (MOSI) to receive transceiver control data from the processor;
a master input, slave output (MISO) to transmit data packets to the processor; and
a serial clock input (SCLK) to receive a master clock signal from the processor; and
a plurality of slave SPIs coupled to the plurality of transceivers, each one of the plurality of SPIs including:
a MISO to receive the data packets from a respective one of the plurality of transceivers; and
a MOSI to forward the transceiver control data to the respective one of the plurality of transceivers; and
a serial clock input (SCLK) to forward the master clock signal to the respective one of the plurality of transceivers.

9. A method of processing data packets on a communication link having a plurality of wireless communication channels, the method comprising:
simultaneously capturing a plurality of wireless signals, each associated with a respective one of the plurality of wireless communication channels, to generate a respective plurality of electronic signals, the respective plurality of electronic signals including:
a plurality of data packet start signals received at a first plurality of inputs, each of the plurality of data packet start signals being indicative of a start of reception of a data packet by a respective one of a plurality of transceivers on a respective one of the wireless plurality of communication channels, and
a plurality of data packet signals received at a second plurality of inputs, each of the plurality of data packet signals conveying the data packet received by the respective one of the plurality of transceivers on the respective one of the wireless plurality of communication channels; and processing the plurality of electronic signals in parallel, including:
- obtaining a periodic clock signal;
- simultaneously driving a plurality of state machines implemented by a plurality of independent processing modules by using the periodic clock signal to retrieve received data packets corresponding to the plurality of data packet start signals, wherein each of the plurality of state machines corresponds to the respective one of the plurality of wireless communication channels and uses a respective one of the plurality of electronic signals;
- multiplexing the retrieved data packets by using a multiplexer coupled to the plurality of independent processing modules; and
- generating, by an output coupled to the multiplexer, a data stream including the multiplexed, retrieved data packets for subsequent processing.

10. The method of claim 9, wherein simultaneously capturing the plurality of wireless signals includes:
- capturing a wireless signal that includes the plurality of wireless signals using a single antenna;
- splitting the captured wireless signal into a plurality of copies of the captured wireless signal; and
- supplying the plurality of copies of the captured wireless signal to a plurality of wireless transceivers to generate the multiplicity of electronic signals.

11. The method of claim 10, further comprising amplifying the captured wireless signal prior to splitting the captured wireless signal.

12. The method of claim 10, wherein each of the plurality of wireless transceivers is tuned to a frequency associated with a corresponding one of the plurality of communication channels.

13. The method of claim 10, wherein each of the plurality of wireless transceivers generates, for a corresponding one of the plurality of communication channels a packet start signal indicative of a beginning of a data packet, and a packet end signal indicative of an end of a data packet.

14. The method of claim 9, wherein processing the plurality of electronic signals in parallel further includes generating a time stamp for each captured data packet, including generating an equal time stamp for two data packets captured at two distinct wireless communication channels within a same cycle of the periodic clock signal.

15. The method of claim 9, wherein processing the plurality of electronic signals in parallel further includes maintaining an independent first-in-first-out (FIFO) memory buffer for each of the plurality of electronic signals.

16. The method of claim 9, further comprising:
- transmitting the data stream to a user interface executing on a computer system; and
- displaying the data stream at the user interface.

17. The method of claim 9, further comprising selecting between at least a receive mode and a control mode, wherein:
- the receive mode corresponds to retrieving the data packets, multiplexing the retrieved data packets, and generating the multiplexed, received data packets for subsequent processing, and
- the control mode corresponds to receiving control data and forwarding the received control data to a specified one of the plurality of transceivers.

* * * * *